US012779875B2

(12) United States Patent
Miyasa

(10) Patent No.: US 12,779,875 B2
(45) Date of Patent: Nov. 3, 2026

(54) RECORDING METHOD USING REACTION, COATING, AND TREATMENT LIQUID

(71) Applicant: SEIKO EPSON CORPORATION, Tokyo (JP)

(72) Inventor: Ryota Miyasa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 194 days.

(21) Appl. No.: 18/678,289

(22) Filed: May 30, 2024

(65) Prior Publication Data

US 2024/0399757 A1 Dec. 5, 2024

(30) Foreign Application Priority Data

Jun. 2, 2023 (JP) ................................ 2023-091477

(51) Int. Cl.

*B41J 2/21* (2006.01)
*B41J 3/407* (2006.01)
*C09D 11/326* (2014.01)
*D06P 5/30* (2006.01)

(52) U.S. Cl.

CPC .......... *B41J 2/2114* (2013.01); *B41J 3/4078* (2013.01); *C09D 11/326* (2013.01); *D06P 5/30* (2013.01)

(58) Field of Classification Search

CPC ...... B41J 2/2114; B41J 3/4078; B41J 2/2117; C09D 11/326; C09D 11/54; D06P 1/445; D06P 1/65125; D06P 5/005; D06P 3/34
USPC .......................................... 347/84, 100, 95
See application file for complete search history.

(56) References Cited

U.S. PATENT DOCUMENTS

2019/0283464 A1* 9/2019 Matsuzaki ............. C09D 11/38
2024/0400849 A1* 12/2024 Yamada .................... D06P 5/30

FOREIGN PATENT DOCUMENTS

EP 3061618 A1 * 8/2016 ............ C09D 11/54
JP 2022-003175 A 1/2022
WO WO-2021211138 A1 * 10/2021 ........... B41J 2/2114

* cited by examiner

*Primary Examiner* — Manish S Shah
*Assistant Examiner* — Samuel Frederick Boelitz
(74) *Attorney, Agent, or Firm* — Harness, Dickey & Pierce, P.L.C.

(57) ABSTRACT

A recording method including attaching a reaction liquid composition containing an aggregating agent to a fabric, attaching a black ink composition to the fabric by an ink jet method, attaching a coating liquid composition to the fabric by an ink jet method, and attaching a treatment liquid composition, which contains a specific substance that is either particles containing forcibly emulsified organopolysiloxane or an aliphatic ester to the fabric by an ink jet method. A content of the specific substance is 60% by mass or more relative to a total amount of non-volatile components in the treatment liquid composition, the coating liquid is attached before the treatment liquid, and a time difference from when the coating liquid composition is attached to when the treatment liquid composition is attached to a region to which the coating liquid composition is attached is 60 seconds or shorter.

9 Claims, 11 Drawing Sheets

FIG. 3

| | | ROW | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| HEAD CONFIGURATION | | CHIP a | COATING | COATING | TREATMENT | TREATMENT | INK | INK | REACTION | REACTION | REACTION | REACTION | INK | INK | TREATMENT | TREATMENT | COATING | COATING |
| | | CHIP b | COATING | COATING | TREATMENT | TREATMENT | INK | INK | REACTION | REACTION | REACTION | REACTION | INK | INK | TREATMENT | TREATMENT | COATING | COATING |
| STRIKE METHOD 1 | | ROW | 1 | 2 | 3 | 4 | 5 | 6 | 7 | 8 | 9 | 10 | 11 | 12 | 13 | 14 | 15 | 16 |
| | Step1 | CHIP a | | | | | INK | INK | REACTION | REACTION | REACTION | REACTION | INK | INK | | | | |
| | | CHIP b | | | | | INK | INK | REACTION | REACTION | REACTION | REACTION | INK | INK | | | | |
| | Step2 | CHIP a | COATING | COATING | TREATMENT | TREATMENT | | | | | | | | | TREATMENT | TREATMENT | COATING | COATING |
| | | CHIP b | COATING | COATING | TREATMENT | TREATMENT | | | | | | | | | TREATMENT | TREATMENT | COATING | COATING |
| STRIKE METHOD 2 | | ROW | 1 | 2 | 3 | 4 | 5 | 6 | 7 | 8 | 9 | 10 | 11 | 12 | 13 | 14 | 15 | 16 |
| | Step1 | CHIP a | COATING | COATING | | | INK | INK | REACTION | REACTION | REACTION | REACTION | INK | INK | | | COATING | COATING |
| | | CHIP b | COATING | COATING | | | INK | INK | REACTION | REACTION | REACTION | REACTION | INK | INK | | | COATING | COATING |
| | Step2 | CHIP a | | | TREATMENT | TREATMENT | | | | | | | | | TREATMENT | TREATMENT | | |
| | | CHIP b | | | TREATMENT | TREATMENT | | | | | | | | | TREATMENT | TREATMENT | | |
| STRIKE METHOD 3 | | ROW | 1 | 2 | 3 | 4 | 5 | 6 | 7 | 8 | 9 | 10 | 11 | 12 | 13 | 14 | 15 | 16 |
| | Step1 | CHIP a | | | | | | | REACTION | REACTION | REACTION | REACTION | | | | | | |
| | | CHIP b | | | | | | | REACTION | REACTION | REACTION | REACTION | | | | | | |
| | Step2 | CHIP a | | | | | INK | INK | | | | | INK | INK | | | | |
| | | CHIP b | | | | | INK | INK | | | | | INK | INK | | | | |
| | Step3 | CHIP a | COATING | COATING | TREATMENT | TREATMENT | | | | | | | | | TREATMENT | TREATMENT | COATING | COATING |
| | | CHIP b | COATING | COATING | TREATMENT | TREATMENT | | | | | | | | | TREATMENT | TREATMENT | COATING | COATING |
| STRIKE METHOD 4 | | ROW | 1 | 2 | 3 | 4 | 5 | 6 | 7 | 8 | 9 | 10 | 11 | 12 | 13 | 14 | 15 | 16 |
| | Step1 | CHIP a | | | TREATMENT | TREATMENT | | | | | | | | | TREATMENT | TREATMENT | | |
| | | CHIP b | | | TREATMENT | TREATMENT | | | | | | | | | TREATMENT | TREATMENT | | |
| | Step2 | CHIP a | | | | | INK | INK | REACTION | REACTION | REACTION | REACTION | INK | INK | | | | |
| | | CHIP b | | | | | INK | INK | REACTION | REACTION | REACTION | REACTION | INK | INK | | | | |
| | Step3 | CHIP a | COATING | COATING | | | | | | | | | | | | | COATING | COATING |
| | | CHIP b | COATING | COATING | | | | | | | | | | | | | COATING | COATING |
| STRIKE METHOD 5 | | ROW | 1 | 2 | 3 | 4 | 5 | 6 | 7 | 8 | 9 | 10 | 11 | 12 | 13 | 14 | 15 | 16 |
| | Step1 | CHIP a | COATING | | | | INK | INK | REACTION | REACTION | REACTION | REACTION | INK | INK | | | | COATING |
| | | CHIP b | COATING | | | | INK | INK | REACTION | REACTION | REACTION | REACTION | INK | INK | | | | COATING |
| | Step2 | CHIP a | COATING | | TREATMENT | TREATMENT | | | | | | | | | TREATMENT | TREATMENT | | COATING |
| | | CHIP b | COATING | | TREATMENT | TREATMENT | | | | | | | | | TREATMENT | TREATMENT | | COATING |

FIG. 5

TABLE 1: REACTION LIQUID COMPOSITION

| | | % BY MASS | ink1−1 | ink1−2 | ink1−3 | ink1−4 |
|---|---|---|---|---|---|---|
| AGGREGATING AGENT | METAL SALT | MAGNESIUM SULFATE HEPTAHYDRATE | 3.0 | 3.0 | − | 3.0 |
| | CATIONIC RESIN Em | CATIONIC ACRYLIC RESIN (Mowinyl 7820, JAPAN COATING RESIN CORPORATION) | − | − | 3.0 | − |
| | WATER-SOLUBLE CATIONIC RESIN | POLYALLYLAMINE (PAA−SA, NITTOBO MEDICAL CO., LTD.) | − | 3.0 | − | − |
| | ORGANIC ACID | DL−LACTIC ACID | − | − | 3.5 | 3.5 |
| MOISTURIZING AGENT | GLYCERIN | | 30.0 | 20.0 | 22.0 | 28.0 |
| SOLVENT | 1,2−HEXANEDIOL | | 0.2 | 0.5 | 0.5 | 0.5 |
| SURFACTANT | OLFINE E1010 | | 0.5 | 0.5 | 0.5 | 0.5 |
| WATER | ION EXCHANGE WATER | | REMAINDER | REMAINDER | REMAINDER | REMAINDER |

*"% BY MASS" IN THE TABLE INDICATES THE VALUE OF THE ACTIVE COMPONENT CONCENTRATION.

FIG. 6

TABLE 2: BLACK INK COMPOSITION

| % BY MASS | | | ink2−1 |
|---|---|---|---|
| INK COLOR | | | Black |
| ANIONIC RESIN | ANIONIC SELF-DISPERSING RESIN Em | POLYCARBONATE-BASED POLYURETHANE (TAKELAC WS−5100, MITSUI CHEMICALS & SKC POLYURETHANES INC.) | 4.0 |
| ANIONIC PIGMENT | ANIONIC SELF-DISPERSING PIGMENT | Black PIGMENT Carbon black | 4.0 |
| | ANIONIC RESIN DISPERSED PIGMENT | Black PIGMENT Carbon black | – |
| MOISTURIZING AGENT | GLYCERIN | | 21.0 |
| SOLVENT | 1,2−HEXANEDIOL | | 1.0 |
| SURFACTANT | OLFINE E1010 | | 0.5 |
| WATER | ION EXCHANGE WATER | | REMAINDER |
| NON-VOLATILE COMPONENT CONCENTRATION | | | 8.0 |
| RESIN PARTICLE COMPONENT CONCENTRATION | | | 4.0 |
| RATIO OF RESIN PARTICLE COMPONENT CONCENTRATION TO NON-VOLATILE COMPONENT CONCENTRATION | | | 50.0% |

*"% BY MASS" IN THE TABLE INDICATES THE VALUE OF THE ACTIVE COMPONENT CONCENTRATION.

FIG. 7

TABLE 3: COATING LIQUID COMPOSITION

| % BY MASS | | | ink3−1 | ink3−2 |
|---|---|---|---|---|
| RESIN DISPERSION | ANIONIC RESIN DISPERSION | POLYCARBONATE-BASED POLYURETHANE (TAKELAC WS−5100, MITSUI CHEMICALS & SKC POLYURETHANES INC.) | 10.0 | 9.0 |
| WATER-SOLUBLE RESIN | | ACRYLIC RESIN CONTAINING OXAZOLINE GROUP (EPOCROS WS−700, NIPPON SHOKUBAI CO., LTD.) | − | 3.0 |
| WAX | | POLYETHYLENE WAX (BYK, AQUACER515) | − | 1.0 |
| MOISTURIZING AGENT | | GLYCERIN | 20.0 | 13.0 |
| SOLVENT | | 1,2−HEXANEDIOL | 1.0 | 1.0 |
| SURFACTANT | | OLFINE E1010 | 0.5 | 0.5 |
| WATER | | ION EXCHANGE WATER | REMAINDER | REMAINDER |
| NON-VOLATILE COMPONENT CONCENTRATION | | | 10.0 | 13.0 |
| RESIN PARTICLE COMPONENT CONCENTRATION | | | 10.0 | 9.0 |
| RATIO OF RESIN PARTICLE COMPONENT CONCENTRATION TO NON-VOLATILE COMPONENT CONCENTRATION | | | 100% | 69% |

*"% BY MASS" IN THE TABLE INDICATES THE VALUE OF THE ACTIVE COMPONENT CONCENTRATION.

FIG. 8

TABLE 4: TREATMENT LIQUID COMPOSITION

| % BY MASS | | | ink4-1 | ink4-2 | ink4-3 | ink4-4 | ink4-5 | ink4-6 | ink4-7 |
|---|---|---|---|---|---|---|---|---|---|
| COLOR DEVELOPER | NONIONIC SILICONE OIL | DIMETHYL SILICONE OIL (KF-96H-10000cs, SHIN-ETSU CHEMICAL CO., LTD.) | - | 7.0 | - | 5.0 | 3.0 | 7.0 | 7.0 |
| | CATIONIC SILICONE OIL | AMINO-MODIFIED SILICONE OIL (KF-868, SHIN-ETSU CHEMICAL CO., LTD.) | 7.0 | - | - | - | - | - | - |
| | FATTY ACID ESTER-BASED | POLYOXYETHYLENE DILAURATE (IONET DL-200, SANYO CHEMICAL INDUSTRIES, LTD.) | - | - | 5.0 | - | - | - | - |
| NONIONIC SURFACTANT | | POLYOXYETHYLENE TRIDECYL ETHER (NEWCOL 1310, HLB 13.7, NIPPON NYUKAZAI CO., LTD.) | 0.4 | 0.5 | 0.5 | 0.5 | 0.5 | 0.5 | 0.5 |
| | | POLYOXYETHYLENE TRIDECYL ETHER (NEWCOL 1305, HLB 10.5, NIPPON NYUKAZAI CO., LTD.) | - | 0.5 | 0.5 | 0.5 | 0.5 | 0.5 | 0.5 |
| | | ACETYLENE-BASED SURFACTANT (SURFYNOL 104, HLB 4, NISSIN CHEMICAL CO., LTD.) | - | - | - | - | - | 0.2 | - |
| | | ACETYLENE-BASED SURFACTANT (OLFINE E1020, HLB 15 to 16, NISSIN CHEMICAL CO., LTD.) | - | - | - | - | - | - | 0.2 |
| RESIN | NONIONIC WATER-SOLUBLE RESIN | POLYVINYLPYRROLIDONE (PITZCOL K-17L, DKS CO., LTD.) | - | - | - | 2.0 | 4.0 | - | - |
| MOISTURIZING AGENT | | GLYCERIN | 20.0 | 20.0 | 15.0 | 15.0 | 9.0 | 20.0 | 20.0 |
| SOLVENT | | 1,2-HEXANEDIOL | 1.0 | 1.0 | 1.0 | 1.0 | 1.0 | 1.0 | 1.0 |
| pH ADJUSTER | | LACTIC ACID | 0.47 | - | - | - | - | - | - |
| WATER | | ION EXCHANGE WATER | REMAINDER | REMAINDER | REMAINDER | REMAINDER | REMAINDER | REMAINDER | REMAINDER |
| NON-VOLATILE COMPONENT CONCENTRATION | | | 7.4 | 8.0 | 6.0 | 8.0 | 8.0 | 8.2 | 8.2 |
| COLOR DEVELOPER COMPONENT CONCENTRATION | | | 7.0 | 7.0 | 5.0 | 5.0 | 3.0 | 7.0 | 7.0 |
| RATIO OF COLOR DEVELOPER COMPONENT CONCENTRATION TO NON-VOLATILE COMPONENT CONCENTRATION | | | 95% | 88% | 83% | 63% | 38% | 85% | 85% |

*"% BY MASS" IN THE TABLE INDICATES THE VALUE OF THE ACTIVE COMPONENT CONCENTRATION.

FIG. 9

TABLE 5:

| | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|---|
| INK COMPOSITION | REACTION LIQUID COMPOSITION | | ink1-1 | ink1-1 | ink1-1 | ink1-1 | ink1-1 | ink1-1 | ink1-1 | ink1-1 | ink1-1 |
| | INK COMPOSITION | | ink2-1 | ink2-1 | ink2-1 | ink2-1 | ink2-1 | ink2-1 | ink2-1 | ink2-1 | ink2-1 |
| | COATING LIQUID COMPOSITION | | ink3-1 | ink3-1 | ink3-1 | ink3-1 | ink3-1 | ink3-1 | ink3-2 | ink3-1 | ink3-1 |
| | TREATMENT LIQUID COMPOSITION | | ink4-2 | ink4-2 | ink4-2 | ink4-1 | ink4-3 | ink4-4 | ink4-2 | ink4-2 | ink4-2 |
| INK PROPERTIES | MIXING AND AGGREGATION PROPERTIES WITH REACTION LIQUID COMPOSITION | INK COMPOSITION | CONFIRMED | CONFIRMED | CONFIRMED | CONFIRMED | CONFIRMED | CONFIRMED | CONFIRMED | CONFIRMED | CONFIRMED |
| | | COATING LIQUID COMPOSITION | CONFIRMED | CONFIRMED | CONFIRMED | CONFIRMED | CONFIRMED | CONFIRMED | CONFIRMED | CONFIRMED | CONFIRMED |
| | | TREATMENT LIQUID COMPOSITION | NOT CONFIRMED | NOT CONFIRMED | NOT CONFIRMED | NOT CONFIRMED | NOT CONFIRMED | NOT CONFIRMED | NOT CONFIRMED | NOT CONFIRMED | NOT CONFIRMED |
| RECORDING METHOD | STRIKE METHOD | | STRIKE METHOD 3 | STRIKE METHOD 3 | STRIKE METHOD 1 | STRIKE METHOD 1 | STRIKE METHOD 1 | STRIKE METHOD 1 | STRIKE METHOD 1 | STRIKE METHOD 5 | STRIKE METHOD 2 |
| | LANDING ORDER | REACTION LIQUID COMPOSITION | 1 | 1 | 2 | 2 | 2 | 2 | 2 | 3 | 3 |
| | | INK COMPOSITION | 2 | 2 | 1 | 1 | 1 | 1 | 1 | 2 | 2 |
| | | COATING LIQUID COMPOSITION | 3 | 3 | 3 | 3 | 3 | 3 | 3 | 1 | 1 |
| | | TREATMENT LIQUID COMPOSITION | 4 | 4 | 4 | 4 | 4 | 4 | 4 | 4 | 4 |
| | DRYING STEP BETWEEN APPLICATION OF REACTION LIQUID AND APPLICATION OF OTHER INKS | | PROVIDED | NOT PROVIDED | NOT PROVIDED | NOT PROVIDED | NOT PROVIDED | NOT PROVIDED | NOT PROVIDED | NOT PROVIDED | NOT PROVIDED |
| | ELAPSED TIME FROM INITIAL INK LANDING (sec) | REACTION LIQUID COMPOSITION | - | - | 0.01 | 0.01 | 0.01 | 0.01 | 0.01 | 0.03 | 0.03 |
| | | INK COMPOSITION | 300.00 | 300.00 | - | - | - | - | - | 0.02 | 0.02 |
| | | COATING LIQUID COMPOSITION | 309.60 | 309.60 | 9.60 | 9.60 | 9.60 | 9.60 | 9.60 | - | - |
| | | TREATMENT LIQUID COMPOSITION | 309.61 | 309.61 | 9.61 | 9.61 | 9.61 | 9.61 | 9.61 | 9.63 | 9.63 |
| | RELATIONSHIP BETWEEN COATING LIQUID AND TREATMENT LIQUID | PRESENCE OR ABSENCE OF LANDING OF COATING LIQUID AFTER LANDING OF TREATMENT LIQUID BY SAME Pass | PRESENCE | PRESENCE | PRESENCE | PRESENCE | PRESENCE | PRESENCE | PRESENCE | PRESENCE | ABSENCE |
| | | TIME DIFFERENCE BETWEEN LANDING OF COATING LIQUID AND LANDING OF TREATMENT LIQUID (sec) | 0.01 | 0.01 | 0.01 | 0.01 | 0.01 | 0.01 | 0.01 | 9.63 | 9.63 |
| | TIME FROM INITIAL LANDING TO LAST LANDING OF TREATMENT LIQUID IN SPECIFIC REGION (sec) | | 9.5 | 9.5 | 9.5 | 9.5 | 9.5 | 9.5 | 9.5 | 9.5 | 9.5 |
| | APPLICATION AMOUNT | REACTION LIQUID g/m² | 30 | 30 | 30 | 30 | 30 | 30 | 30 | 30 | 30 |
| | | INK g/m² | 60 | 60 | 60 | 60 | 60 | 60 | 60 | 60 | 60 |
| | | COATING LIQUID g/m² | 30 | 30 | 30 | 30 | 30 | 30 | 30 | 30 | 30 |
| | | TREATMENT LIQUID g/m² | 15 | 15 | 15 | 15 | 15 | 15 | 15 | 15 | 15 |
| EVALUATION | | COLOR DEVELOPABILITY (BLACK) | B | B | A | A | A | B | A | A | A |
| | | BLEEDING | S | S | A | S | S | S | S | A | B |
| | | YELLOWING | A | A | A | B | B | A | A | A | A |
| | | ABRASION RESISTANCE (DRY) | S | S | S | S | B | S | A | A | A |
| | | STORAGE STABILITY OF TREATMENT LIQUID | A | A | A | A | A | A | A | A | A |

FIG. 10

TABLE 6:

| | | | EXAMPLE 10 | EXAMPLE 11 | EXAMPLE 12 | EXAMPLE 13 | EXAMPLE 14 | EXAMPLE 15 | EXAMPLE 16 | EXAMPLE 17 |
|---|---|---|---|---|---|---|---|---|---|---|
| INK COMPOSITION | REACTION LIQUID COMPOSITION | | ink1-1 | ink1-1 | ink1-1 | ink1-1 | ink1-1 | ink1-2 | ink1-3 | ink1-4 |
| | INK COMPOSITION | | ink2-1 | ink2-1 | ink2-1 | ink2-1 | ink2-1 | ink2-1 | ink2-1 | ink2-1 |
| | COATING LIQUID COMPOSITION | | ink3-1 | ink3-1 | ink3-1 | ink3-1 | ink3-1 | ink3-1 | ink3-1 | ink3-1 |
| | TREATMENT LIQUID COMPOSITION | | ink4-2 | ink4-2 | ink4-2 | ink4-6 | ink4-7 | ink4-2 | ink4-2 | ink4-2 |
| INK PROPERTIES | MIXING AND AGGREGATION PROPERTIES WITH REACTION LIQUID COMPOSITION | INK COMPOSITION | CONFIRMED | CONFIRMED | CONFIRMED | CONFIRMED | CONFIRMED | CONFIRMED | CONFIRMED | CONFIRMED |
| | | COATING LIQUID COMPOSITION | CONFIRMED | CONFIRMED | CONFIRMED | CONFIRMED | CONFIRMED | CONFIRMED | CONFIRMED | CONFIRMED |
| | | TREATMENT LIQUID COMPOSITION | NOT CONFIRMED | NOT CONFIRMED | NOT CONFIRMED | NOT CONFIRMED | NOT CONFIRMED | NOT CONFIRMED | NOT CONFIRMED | NOT CONFIRMED |
| RECORDING METHOD | STRIKE METHOD | | STRIKE METHOD 2 | STRIKE METHOD 1 | STRIKE METHOD 2 | STRIKE METHOD 1 | STRIKE METHOD 1 | STRIKE METHOD 1 | STRIKE METHOD 1 | STRIKE METHOD 1 |
| | LANDING ORDER | REACTION LIQUID COMPOSITION | 3 | 2 | 3 | 2 | 2 | 2 | 2 | 2 |
| | | INK COMPOSITION | 2 | 1 | 2 | 1 | 1 | 1 | 1 | 1 |
| | | COATING LIQUID COMPOSITION | 1 | 3 | 1 | 3 | 3 | 3 | 3 | 3 |
| | | TREATMENT LIQUID COMPOSITION | 4 | 4 | 4 | 4 | 4 | 4 | 4 | 4 |
| | DRYING STEP BETWEEN APPLICATION OF REACTION LIQUID AND APPLICATION OF OTHER INKS | | NOT PROVIDED | NOT PROVIDED | NOT PROVIDED | NOT PROVIDED | NOT PROVIDED | NOT PROVIDED | NOT PROVIDED | NOT PROVIDED |
| | ELAPSED TIME FROM INITIAL INK LANDING (sec) | REACTION LIQUID COMPOSITION | 0.04 | 0.01 | 0.04 | 0.01 | 0.01 | 0.01 | 0.01 | 0.01 |
| | | INK COMPOSITION | 0.03 | - | 0.03 | - | - | - | - | - |
| | | COATING LIQUID COMPOSITION | - | 9.60 | - | 9.60 | 9.60 | 9.60 | 9.60 | 9.60 |
| | | TREATMENT LIQUID COMPOSITION | 43.45 | 9.61 | 43.45 | 9.61 | 9.61 | 9.61 | 9.61 | 9.61 |
| | RELATIONSHIP BETWEEN COATING LIQUID AND TREATMENT LIQUID | PRESENCE OR ABSENCE OF LANDING OF COATING LIQUID AFTER LANDING OF TREATMENT LIQUID BY SAME Pass | ABSENCE | PRESENCE | ABSENCE | PRESENCE | PRESENCE | PRESENCE | PRESENCE | PRESENCE |
| | | TIME DIFFERENCE BETWEEN LANDING OF COATING LIQUID AND LANDING OF TREATMENT LIQUID (sec) | 43.45 | 0.01 | 43.45 | 0.01 | 0.01 | 0.01 | 0.01 | 0.01 |
| | TIME FROM INITIAL LANDING TO LAST LANDING OF TREATMENT LIQUID IN SPECIFIC REGION (sec) | | 30.29 | 6.01 | 30.29 | 9.5 | 9.5 | 9.5 | 9.5 | 9.5 |
| | APPLICATION AMOUNT | REACTION LIQUID $g/m^2$ | 30 | 30 | 30 | 30 | 30 | 30 | 30 | 30 |
| | | INK $g/m^2$ | 60 | 60 | 60 | 60 | 60 | 60 | 60 | 60 |
| | | COATING LIQUID $g/m^2$ | 30 | 30 | 30 | 30 | 30 | 30 | 30 | 30 |
| | | TREATMENT LIQUID $g/m^2$ | 15 | 15 | 25 | 15 | 15 | 15 | 15 | 15 |
| EVALUATION | | COLOR DEVELOPABILITY (BLACK) | A | A | S | A | A | S | S | A |
| | | BLEEDING | S | B | A | B | A | S | A | B |
| | | YELLOWING | A | A | A | A | A | A | A | A |
| | | ABRASION RESISTANCE (DRY) | S | S | A | S | S | S | S | S |
| | | STORAGE STABILITY OF TREATMENT LIQUID | A | A | A | B | A | A | A | A |

FIG. 11

TABLE 7:

| | | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|
| INK COMPOSITION | REACTION LIQUID COMPOSITION | | ink1-1 | ink1-1 | ink1-1 | ink1-1 | ink1-1 |
| | INK COMPOSITION | | ink2-1 | ink2-1 | ink2-1 | ink2-1 | ink2-1 |
| | COATING LIQUID COMPOSITION | | ink3-1 | - | ink3-1 | ink3-1 | ink3-1 |
| | TREATMENT LIQUID COMPOSITION | | - | ink4-2 | ink4-2 | ink4-2 | ink4-5 |
| INK PROPERTIES | MIXING AND AGGREGATION PROPERTIES WITH REACTION LIQUID COMPOSITION | INK COMPOSITION | CONFIRMED | CONFIRMED | CONFIRMED | CONFIRMED | CONFIRMED |
| | | COATING LIQUID COMPOSITION | CONFIRMED | - | CONFIRMED | CONFIRMED | CONFIRMED |
| | | TREATMENT LIQUID COMPOSITION | - | NOT CONFIRMED | NOT CONFIRMED | NOT CONFIRMED | NOT CONFIRMED |
| RECORDING METHOD | STRIKE METHOD | | STRIKE METHOD 1_ WITHOUT TREATMENT LIQUID | STRIKE METHOD 1_ WITHOUT COATING LIQUID | STRIKE METHOD 4 | STRIKE METHOD 2 | STRIKE METHOD 1 |
| | LANDING ORDER | REACTION LIQUID COMPOSITION | 2 | 2 | 3 | 3 | 2 |
| | | INK COMPOSITION | 1 | 1 | 2 | 2 | 1 |
| | | COATING LIQUID COMPOSITION | 3 | - | 4 | 1 | 3 |
| | | TREATMENT LIQUID COMPOSITION | - | 3 | 1 | 4 | 4 |
| | DRYING STEP BETWEEN APPLICATION OF REACTION LIQUID AND APPLICATION OF OTHER INKS | | NOT PROVIDED | NOT PROVIDED | NOT PROVIDED | NOT PROVIDED | NOT PROVIDED |
| | ELAPSED TIME FROM INITIAL INK LANDING (sec) | REACTION LIQUID COMPOSITION | 0.01 | 0.01 | 9.63 | 0.03 | 0.01 |
| | | INK COMPOSITION | - | - | 9.62 | 0.02 | - |
| | | COATING LIQUID COMPOSITION | 9.60 | - | 19.22 | - | 9.60 |
| | | TREATMENT LIQUID COMPOSITION | - | 9.61 | - | 80.00 | 9.61 |
| | RELATIONSHIP BETWEEN COATING LIQUID AND TREATMENT LIQUID | PRESENCE OR ABSENCE OF LANDING OF COATING LIQUID AFTER LANDING OF TREATMENT LIQUID BY SAME Pass | - | - | ABSENCE | ABSENCE | PRESENCE |
| | | TIME DIFFERENCE BETWEEN LANDING OF COATING LIQUID AND LANDING OF TREATMENT LIQUID (sec) | - | - | 19.22 | 80.00 | 0.01 |
| | TIME FROM INITIAL LANDING TO LAST LANDING OF TREATMENT LIQUID IN SPECIFIC REGION (sec) | | 9.5 | 9.5 | 9.5 | 9.5 | 9.5 |
| | APPLICATION AMOUNT | REACTION LIQUID $g/m^2$ | 30 | 30 | 30 | 30 | 30 |
| | | INK $g/m^2$ | 60 | 60 | 60 | 60 | 60 |
| | | COATING LIQUID $g/m^2$ | 30 | - | 30 | 30 | 30 |
| | | TREATMENT LIQUID $g/m^2$ | - | 15 | 15 | 15 | 15 |
| EVALUATION | | COLOR DEVELOPABILITY (BLACK) | C | A | A | A | C |
| | | BLEEDING | A | A | C | C | S |
| | | YELLOWING | A | A | A | A | A |
| | | ABRASION RESISTANCE (DRY) | S | C | A | A | A |
| | | STORAGE STABILITY OF TREATMENT LIQUID | A | A | A | A | A |

RECORDING METHOD USING REACTION, COATING, AND TREATMENT LIQUID

The present application is based on, and claims priority from JP Application Serial Number 2023-091477, filed Jun. 2, 2023, the disclosure of which is hereby incorporated by reference herein in its entirety.

BACKGROUND

1. Technical Field

The present disclosure relates to a recording method.

2. Related Art

Attempts are made to apply an ink jet method to not only recording of images on paper and the like, but also textile printing on fabrics, and various ink jet textile printing methods are investigated. An ink jet ink for textile printing contains a coloring material in order to obtain an image having a desired color, and as the coloring material, dyes and pigments are used. In addition, in ink jet textile printing, many investigations are conducted on inks and recording methods.

For example, JP-A-2022-003175 describes the use of organopolysiloxane in ink jet textile printing for the purpose of enhancing the fastness of an image using a pigment and improving the texture of recorded matter.

Pigment textile printing is inferior to dye textile printing in terms of rubbing fastness of an image and color developability of a printed textile, and improvements thereof are required. In addition, it is required that there is no bleeding in the printed textile. In addition, ink jet pigment textile printing has a simple process compared to analog textile printing and ink jet dye textile printing, is excellent in terms of low environmental load such as drainage, and is required to maintain a simple process.

SUMMARY

According to an aspect of the present disclosure, there is provided a recording method including

- a reaction liquid attachment step of attaching a reaction liquid composition containing an aggregating agent that aggregates components in an ink to a fabric,
- an ink attachment step of attaching a black ink composition containing a black pigment and water to the fabric by an ink jet method,
- a coating liquid attachment step of attaching a coating liquid composition containing anionic resin particles and water to the fabric by an ink jet method, and
- a treatment liquid attachment step of attaching a treatment liquid composition, which contains any specific substance selected from particles containing forcibly emulsified organopolysiloxane and an aliphatic ester, and water, and does not contain a coloring material or has a coloring material content of 0.1% by mass or less with respect to a total amount of the treatment liquid composition, to the fabric by an ink jet method, in which
- a content of the specific substance is 60% by mass or more with respect to a total amount of non-volatile components in the treatment liquid composition,
- the coating liquid attachment step is performed before the treatment liquid attachment step, and
- a time difference from when the coating liquid composition is attached by the coating liquid attachment step to when the treatment liquid composition is attached to a region to which the coating liquid composition is attached by the treatment liquid attachment step is 60 seconds or shorter.

BRIEF DESCRIPTION OF THE DRAWINGS

FIG. 3 is a view showing head configurations, strike methods, and compositions to be discharged in Examples and Comparative Examples.

FIG. 5 is a table (Table 1) showing compositions of reaction liquid compositions according to Examples and Comparative Examples.

FIG. 6 is a table (Table 2) showing compositions of black ink compositions according to Examples and Comparative Examples.

FIG. 7 is a table (Table 3) showing compositions of coating liquid compositions according to Examples and Comparative Examples.

FIG. 8 is a table (Table 4) showing compositions of treatment liquid compositions used in Examples and Comparative Examples.

FIG. 9 is a table (Table 5) showing conditions and evaluation results according to Examples.

FIG. 10 is a table (Table 6) showing conditions and evaluation results according to Examples.

FIG. 11 is a table (Table 7) showing conditions and evaluation results of Comparative Examples.

DESCRIPTION OF EMBODIMENTS

Figure 1:
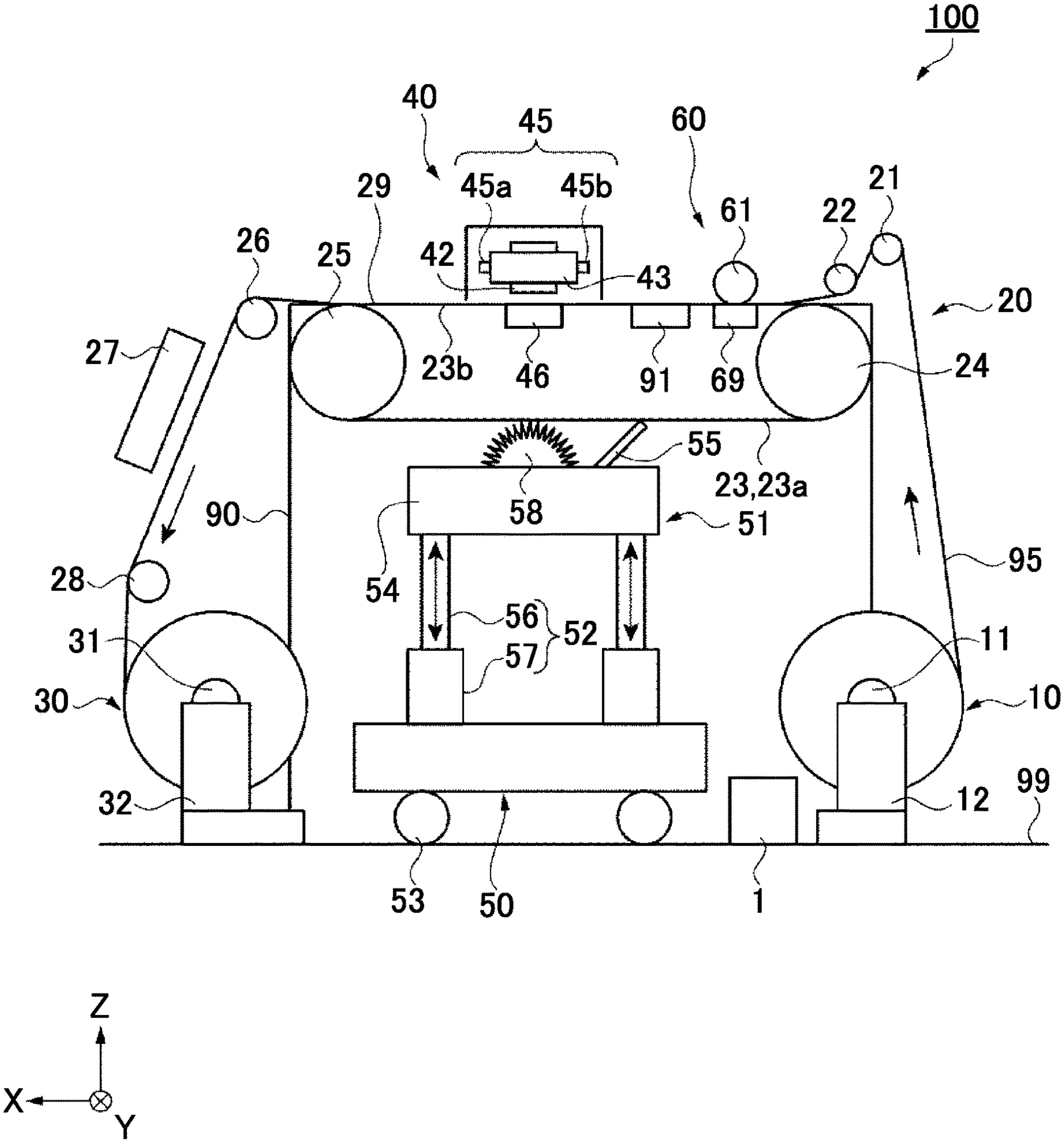
FIG. 1 is a schematic view showing a schematic overall configuration of a recording apparatus applicable to a recording method according to the present embodiment.

Hereinafter, embodiments of the present disclosure will be described. The embodiments described below describe examples of the present disclosure. The present disclosure is not limited to the following embodiments, and includes various modifications implemented within a range not changing a gist of the present disclosure. It should be noted that not all of the configurations described below are essential configurations of the present disclosure.

1. Recording Method

A recording method according to the present embodiment includes a reaction liquid attachment step of attaching a reaction liquid composition containing an aggregating agent that aggregates components in an ink to a fabric, an ink attachment step of attaching a black ink composition containing a black pigment and water to the fabric by an ink jet method, a coating liquid attachment step of attaching a coating liquid composition containing anionic resin particles and water to the fabric by an ink jet method, and a treatment liquid attachment step of attaching a treatment liquid composition, which contains any specific substance selected from particles containing forcibly emulsified organopolysiloxane and an aliphatic ester, and water, and does not contain a coloring material or has a coloring material content of 0.1% by mass or less with respect to a total amount of the treatment liquid composition, to the fabric by an ink jet method. Then, a content of the specific substance is 60% by mass or more with respect to a total amount of non-volatile components in the treatment liquid composition, the coating liquid attachment step is performed before the treatment liquid attachment step, and a time difference from when the coating liquid composition is attached by the coating liquid attachment step to when the treatment liquid composition is attached to a region to which the coating liquid composition is attached by the treatment liquid attachment step is 60 seconds or shorter.

1.1. Fabric

The recording method according to the present embodiment is performed on a fabric. The fabric is not particularly limited. The material constituting the fabric is not particularly limited, examples thereof include natural fibers such as cotton, linen, wool, and silk, synthetic fibers such as polypropylene, polyester, acetate, triacetate, polyamide, and polyurethane, and biodegradable fibers such as polylactic acid, and mixed fibers thereof may be used. As the fabric, the fibers described above may be in any form such as a woven fabric, a knitted fabric, and a nonwoven fabric, and may be mixed fibers.

1.2. Reaction Liquid Attachment Step

In the reaction liquid attachment step, a reaction liquid composition containing an aggregating agent that aggregates components in an ink is attached to a fabric.

1.2.1. Reaction Liquid Composition

The reaction liquid composition contains at least an aggregating agent that aggregates components of the ink composition. The aggregating agent has an effect of aggregating the pigment and the resin particles by reacting with the components such as the pigment included in the ink composition and the resin particles included in the ink composition and the coating liquid composition. For example, due to such aggregation, the color development of the pigment can be enhanced, the fixability of the resin particles can be enhanced, and/or the viscosity of the ink can be increased.

1.2.1. (1) Aggregating Agent

Although the aggregating agent is not particularly limited, examples thereof include a metal salt, an inorganic acid, an organic acid, and a cationic compound, and as the cationic compound, a cationic resin (cationic polymer), a cationic surfactant, and the like can be used. Among these, a polyvalent metal salt is preferable as the metal salt, and a cationic resin is preferable as the cationic compound. Therefore, as the aggregating agent, it is preferable to select any one of a cationic resin, an organic acid, and a polyvalent metal salt from the viewpoint of obtaining particularly excellent image quality, abrasion resistance, gloss, and the like.

The metal salt is preferably a polyvalent metal salt, but metal salts other than polyvalent metal salts can be used. Among these aggregating agents, it is preferable to use at least one selected from a metal salt and an organic acid from the viewpoint of excellent reactivity with components included in the ink. In addition, among the cationic compounds, cationic resins are preferably used from the viewpoint of easy dissolution in the treatment liquid. In addition, a plurality of types of aggregating agents can be used in combination.

The polyvalent metal salt is a compound formed of a divalent or higher metal ion and an anion. Examples of the divalent or higher metal ion include ions such as calcium, magnesium, copper, nickel, zinc, barium, aluminum, titanium, strontium, chromium, cobalt, iron, and the like. Among the metal ions constituting these polyvalent metal salts, the metal ion is preferably at least one of calcium ion and magnesium ion from the viewpoint of excellent aggregation properties of the components of the ink.

The anion constituting the polyvalent metal salt is an inorganic ion or an organic ion. That is, the polyvalent metal salt in the present disclosure is formed of an inorganic ion or an organic ion and a polyvalent metal. Examples of the inorganic ion include a chloride ion, a bromine ion, an iodine ion, a nitrate ion, a sulfate ion, and a hydroxide ion. Examples of the organic ion include an organic acid ion, and examples thereof include a carboxylic acid ion.

The polyvalent metal compound is preferably an ionic polyvalent metal salt, and in particular, when the polyvalent metal salt is a magnesium salt or a calcium salt, the stability of the treatment liquid is further improved. In addition, as the counter ion of the polyvalent metal, any of an inorganic acid ion and an organic acid ion may be used.

Specific examples of the polyvalent metal salt include a calcium carbonate such as a heavy calcium carbonate and a light calcium carbonate, calcium nitrate, calcium chloride, calcium sulfate, magnesium sulfate, calcium hydroxide, magnesium chloride, magnesium carbonate, barium sulfate, chloride barium, zinc carbonate, zinc sulfide, aluminum silicate, calcium silicate, magnesium silicate, copper nitrate, calcium formate, calcium acetate, magnesium acetate, and aluminum acetate. These polyvalent metal salts may be used alone, or may be used in combination of two or more thereof. Among these, since sufficient solubility in water can be secured and the use thereof reduces traces of the treatment liquid (makes traces less visible), at least any one of calcium formate, magnesium sulfate, calcium nitrate, and calcium chloride is preferable, and calcium formate or calcium nitrate is more preferable. In addition, these metal salts may have hydration water in the form of a raw material.

Examples of the metal salt other than the polyvalent metal salt include monovalent metal salts such as sodium salt and potassium salt, and for example, there are mentioned sodium sulfate, and potassium sulfate.

Preferable examples of the organic acid include poly(meth)acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, derivatives of these compounds, and salts thereof. The organic acid may be used alone or in combination of two or more thereof. Metal salts which are salts of organic acids are included in the metal salts described above.

Examples of the inorganic acid include sulfuric acid, hydrochloric acid, nitric acid, and phosphoric acid. The inorganic acid may be used alone or in combination of two or more thereof.

Examples of the cationic resin (cationic polymer) include a cationic acrylic resin, a cationic urethane-based resin, a cationic olefin-based resin, a cationic amine-based resin, and a cationic surfactant. The cationic polymer is preferably water-soluble.

As the cationic acrylic resin, commercially available products can be used, and examples thereof include SUPERFLEX (registered trademark) 620 and 650, manufactured by DKS Co., Ltd., PARASURF UP-22 manufactured by Ohara Paragium Chemical Co., Ltd., PERMARIN (registered trademark) UC-20 manufactured by Sanyo Chemical Industries, Ltd., ARROWBASE (registered trademark) CB-1200 and CD-1200 manufactured by Unitika, VINYBLAN (registered trademark) 2687 manufactured by Nissin Chemical Industry Co., Ltd., and Mowinyl 7820 manufactured by Japan Coating Resin Corporation.

Commercially available products can be used as the cationic urethane-based resin, and for example, HYDRAN CP-7010, CP-7020, CP-7030, CP-7040, CP-7050, CP-7060, and CP-7610 (trade names, manufactured by DIC Corporation), SUPERFLEX 600, 610, 620, 630, 640, and 650 (trade name, manufactured by DKS Co., Ltd.), urethane emulsion WBR-2120C and WBR-2122C (trade names, manufactured by Taisei Fine Chemical Co., Ltd.), and the like can be used.

The cationic olefin resin is a resin having an olefin such as ethylene and propylene in the structural skeleton, and known ones can be appropriately selected and used. In addition, the cationic olefin resin may be in an emulsion state of being dispersed in a solvent containing water, an organic solvent, or the like. As the cationic olefin resin, a commercially available product can be used, and examples thereof include arrow base CB-1200 and CD-1200 (trade name, manufactured by Unitika Ltd.).

As the cationic amine-based resin (cationic polymer), any resin having an amino group in the structure may be used, and known ones can be appropriately selected and used. Examples thereof include polyamine resin, polyamide resin, polyallylamine resin, and the like. Polyamine resin is a resin having an amino group in the main skeleton of the resin. Polyamide resin is a resin having an amide group in the main skeleton of the resin. Polyallylamine resin is a resin having a structure derived from an allyl group in the main skeleton of the resin.

In addition, as the cationic polyamine-based resin, Unisense KHE103L (hexamethylenediamine/epichlorohydrin resin, 1% aqueous solution of a pH of substantially 5.0, viscosity: 20 to 50 (mPa·s), an aqueous solution with a solid content concentration of 50% by mass) manufactured by Senka Co., Ltd., Unisense KHE104L (dimethylamine/epichlorohydrin resin, 1% aqueous solution of a pH of substantially 7.0, viscosity: 1 to 10 (mPa·s), an aqueous solution with a solid content concentration of 20% by mass), and the like can be used. In addition, specific examples of commercially available products of the cationic polyamine-based resin include FL-14 (manufactured by SNF Co. Ltd.), ARAFIX 100, 251S, 255, and 255LOX (manufactured by Arakawa Chemical Industries, Ltd.), DK-6810, 6853, and 6885; and WS-4010, 4011, 4020, 4024, 4027, and 4030 (manufactured by Seiko PMC Corporation), Papiogen P-105 (manufactured by Senka), Sumirez Resin 650 (30), 675A, 6615, and SLX-1 (manufactured by Taoka Chemical Co., Ltd.), Catiomaster (registered trademark) PD-1, 7, 30, A, PDT-2, PE-10, PE-30, DT-EH, EPA-SK01, and TMHMDA-E (manufactured by Yokkaichi Chemical Company, Limited), and Jetfix 36N, 38A, 5052 (manufactured by Satoda Kako Co., Ltd.).

Examples of the polyamine-based resin include a polyallylamine resin. Examples of the polyallylamine resin include polyallylamine hydrochloride, polyallylamineamide sulfate, allylamine hydrochloride/diallylamine hydrochloride copolymers, allylamine acetate/diallylamine acetate copolymers, allylamine hydrochloride/dimethylallylamine hydrochloride copolymers, allylamine/dimethylallylamine copolymers, polydiallylamine hydrochloride, polymethyldiallylamine hydrochloride, polymethyldiallylamineamide sulfate, polymethyldiallylamine acetate, polydiallyldimethylammonium chloride, diallylamine acetate/sulfur dioxide copolymers, diallylmethylethylammonium ethylsulfate/sulfur dioxide copolymers, methyldiallylamine hydrochloride/sulfur dioxide copolymers, diallyldimethylammonium chloride/sulfur dioxide copolymers, and diallyldimethylammonium chloride/acrylamide copolymers.

Examples of the cationic surfactant include primary, secondary, and tertiary amine salt type compounds, alkylamine salts, dialkylamine salts, aliphatic amine salts, benzalconium salts, quaternary ammonium salts, quaternary alkylammonium salt, alkylpyridinium salt, sulfonium salt, phosphonium salt, onium salt, and imidazolinium salt.

A plurality of types of these aggregating agents may be used. In addition, when at least one of a polyvalent metal salt, an organic acid, and a cationic resin is selected among these aggregating agents, the aggregation action is more favorable, and thus an image with higher quality (particularly favorable color developability) can be formed.

Although the total content of the aggregating agent in the reaction liquid composition is not particularly limited, the total content of the aggregating agent in the reaction liquid composition is, for example, 0.1% by mass or more and 15% by mass or less, preferably 1% by mass or more and 10% by mass or less, and more preferably 2% by mass or more and 10% by mass or less with respect to the total mass of the reaction liquid composition.

1.2.1. (2) Water

The reaction liquid composition may include water. Examples of water include pure water such as ion exchange water, ultrafiltered water, reverse osmosis water, and distilled water, and water such as ultrapure water, from which ionic impurities are removed as much as possible. In addition, when water sterilized by irradiation with ultraviolet rays, addition of hydrogen peroxide, or the like is used, the generation of bacteria or fungi when the composition is stored for a long period of time can be reduced.

The content of water is 30% by mass or more, preferably 40% by mass or more, more preferably 45% by mass or more, and even more preferably 50% by mass or more with respect to the total amount of the reaction liquid composition. The term water in the reaction liquid composition includes, for example, crystal water contained in the aggregating agent used as a raw material or water to be added. When the water content is set to 30% by mass or more, the reaction liquid composition have a relatively low viscosity. Further, the upper limit of the content of water is preferably 90% by mass or less, more preferably 85% by mass or less, and even more preferably 80% by mass or less with respect to the total amount of the reaction liquid composition. In the present specification, the term "aqueous composition" refers to a composition containing 30% by mass or more of water with respect to the total mass (100% by mass) of the composition.

1.2.1. (3) Other Components

The reaction liquid composition may include a moisturizing agent, other solvents, a surfactant, and an additive.

Moisturizing Agent

The treatment liquid composition may contain a moisturizing agent. The moisturizing agent is not particularly limited, and examples thereof include glycerin, 2-pyrrolidone, urea, triethanolamine, propylene glycol, 1-(2-hydroxyethyl)-2-pyrrolidone, trimethylolpropane, triethylene glycol, 1,5-pentanediol, triethylene glycol monomethyl ether, and amino coat. Among these, one moisturizing agent can be used alone or two or more thereof can be used in combination.

Other Solvents

The treatment liquid composition may include other solvents. It is preferable that the other solvent is an organic solvent having water solubility. One of the functions of the organic solvent is to improve the wettability of the treatment liquid composition with respect to a fabric or to enhance the moisture retention properties of the treatment liquid composition. The organic solvent can also function as a penetrant.

Examples of the organic solvent include esters, alkylene glycol ethers, cyclic esters, nitrogen-containing solvents, and polyhydric alcohols. Examples of the nitrogen-containing solvents include cyclic amides and acyclic amides. Examples of the acyclic amides include alkoxyalkylamides.

Examples of the esters include glycol monoacetates such as ethylene glycol monomethyl ether acetate, ethylene glycol monoethyl ether acetate, and ethylene glycol monobutyl ether acetate, and glycol diesters such as ethylene glycol diacetate, diethylene glycol diacetate, and propylene glycol diacetate.

The alkylene glycol ethers may be alkylene glycol monoethers or diethers, and alkyl ethers are preferable. Specific examples thereof include alkylene glycol monoalkyl ethers such as ethylene glycol monomethyl ether, ethylene glycol monoethyl ether, ethylene glycol monoisopropyl ether, and ethylene glycol monobutyl ether, diethylene glycol monomethyl ether, and alkylene glycol dialkyl ethers such as ethylene glycol dimethyl ether, ethylene glycol diethyl ether, ethylene glycol dibutyl ether, diethylene glycol dimethyl ether, and diethylene glycol diethyl ether.

Examples of the cyclic esters include cyclic esters (lactones) such as β-propiolactone, γ-butyrolactone, δ-valerolactone, ε-caprolactone, and β-butyrolactone, and compounds in which a hydrogen of a methylene group adjacent to a carbonyl group thereof is substituted with an alkyl group having 1 to 4 carbon atoms.

Examples of the alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, and 3-n-butoxy-N,N-methylethylpropionamide.

Examples of the cyclic amides include lactams, and examples thereof include pyrrolidones such as 2-pyrrolidone, 1-methyl-2-pyrrolidone, 1-ethyl-2-pyrrolidone, 1-propyl-2-pyrrolidone, and 1-butyl-2-pyrrolidone.

In addition, it is also preferable to use compounds represented by Formula (1) as the alkoxyalkylamides.

$$R^1\text{—O—}CH_2CH_2\text{—(C=O)—}NR^2R^3 \quad (1)$$

In Formula (1), $R^1$ represents an alkyl group having 1 or more and 4 or less carbon atoms, and $R^2$ and $R^3$ each independently represent a methyl group or an ethyl group. The "alkyl group having 1 or more and 4 or less carbon atoms" may be a linear or branched alkyl group, and examples thereof include a methyl group, an ethyl group, an n-propyl group, an iso-propyl group, an n-butyl group, a sec-butyl group, an iso-butyl group, and a tert-butyl group. The compounds represented by Formula (1) may be used alone or as a mixture of two or more thereof.

Examples of the polyhydric alcohols include 1,2-alkanediol (for example, alkanediols such as ethylene glycol, propylene glycol (alias: propane-1,2-diol), 1,2-butanediol, 1,2-pentanediol, 1,2-hexanediol, 1,2-heptanediol, and 1,2-octanediol), and polyhydric alcohols (polyols) excluding the 1,2-alkanediol (for example, diethylene glycol, dipropylene glycol, 1,3-propanediol, 1,3-butanediol (alias: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylol propane, and glycerin).

The polyhydric alcohols can be divided into alkanediols and polyols. The alkanediols are diols of an alkane having 5 or more carbon atoms. The number of carbon atoms of the alkane is preferably 5 to 15, more preferably 6 to 10, and even more preferably 6 to 8. 1,2-alkanediol is preferable.

The polyols are polyols of alkane having 4 or less carbon atoms or intermolecular condensates of hydroxyl groups of polyols of alkane having 4 or less carbon atoms. The number of carbon atoms of the alkane is preferably 2 to 3. The number of the hydroxyl groups in the molecule of the polyols is 2 or more, preferably 5 or less, and more preferably 3 or less. When the polyols are the intermolecular condensates described above, the number of intermolecular condensates is 2 or more, preferably 4 or less, and more preferably 3 or less. The polyhydric alcohols may be used alone or as a mixture of two or more types thereof.

The alkanediols and polyols can mainly function as a penetrating solvent and/or a moisturizing solvent. However, the alkanediols tend to have strong properties as the penetrating solvent, and polyols tend to have strong properties as the moisturizing solvent.

Surfactant

The reaction liquid composition may contain a surfactant. The surfactant has a function of adjusting the surface tension of the composition and adjusting, for example, the wettability with the fabric. Among the surfactants, for example, an acetylene glycol-based surfactant, a silicone-based surfactant, and a fluorine-based surfactant can be preferably used.

The acetylene glycol-based surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all trade names, manufactured by Air Products & Chemicals. Inc.), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all trade names, manufactured by Nissin Chemical Industry Co., Ltd.), and ACETYLENOL E00, E00P, E40, and E100 (all trade names, manufactured by Kawaken Fine Chemicals Co., Ltd.).

The silicone-based surfactant is not particularly limited, and examples thereof preferably include a polysiloxane-based compound. The polysiloxane-based compound is not particularly limited, and examples thereof include a polyether-modified organosiloxane. Examples of commercially available products of the polyether-modified organosiloxane include BYK-306, BYK-307, BYK-333, BYK-341, BYK-345, BYK-346, and BYK-348 (all trade names, manufactured by BYK Japan KK.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.), and SILFACE SAG002, 005, 503A, 008 (all trade names, manufactured by Nissin Chemical Industry Co., Ltd.).

As the fluorine-based surfactant, a fluorine-modified polymer is preferably used, and specific examples thereof include BYK-3440 (manufactured by BYK Japan KK.), SURFLON S-241, S-242, and S-243 (all trade names, manufactured by AGC SEIMI CHEMICAL CO., LTD.), and FTERGENT 215M (manufactured by NEOS COMPANY LIMITED).

When the reaction liquid composition contains a surfactant, a plurality of types of surfactants may be contained. When the reaction liquid composition contains a surfactant, the content thereof can be set to 0.1% by mass or more and 2% by mass or less, preferably 0.4% by mass or more and 1.5% by mass or less, and more preferably 0.3% by mass or more and 1.0% by mass or less with respect to the total mass of the reaction liquid composition.

In the reaction liquid composition, the content of the coloring material is preferably 0.1% by mass or less with respect to the total amount of the reaction liquid composition. That is, it is preferable that the reaction liquid composition is not used with the intention of coloring.

Additive

The reaction liquid composition may include an additive. Examples of the additive include a pH adjuster, saccharides, a chelating agent, a preservatives and a fungicide, a rust inhibitor, and others.

The pH adjuster is not particularly limited, and examples thereof include an appropriate combination of acids, bases, weak acids, and weak bases. Examples of acids and bases used in such a combination include inorganic acids such as sulfuric acid, hydrochloric acid, and nitric acid, inorganic bases such as lithium hydroxide, sodium hydroxide, potassium hydroxide, dihydrogen potassium phosphate, hydrogen disodium phosphate, potassium carbonate, sodium carbonate, hydrogen sodium carbonate, and ammonia, organic bases such as triethanol amine, diethanol amine, monoethanol amine, tripropanol amine, triisopropanol amine, diisopropanol amine, and tris(hydroxymethyl)aminomethane (THAM), and organic acids such as adipic acid, citric acid, succinic acid, lactic acid, Good's buffers such as N,N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyl iminobisacetic acid (ADA), piperazine-1,4-bis(2-ethanesulfonic acid) (PIPES), N-(2-acetamide)-2-aminoethanesulfonic acid (ACES), cholamine chloride, N-tris(hydroxymethyl)methyl-2-aminoethanesulfonic acid (TES), acetamide glycine, tricine, glycine amide, and bicine, a phosphate buffer solution, a citrate buffer solution, and a tris buffer solution. Further, among these, a tertiary amine such as triethanolamine or triisopropanolamine and a carboxy group-containing organic acid such as adipic acid, citric acid, succinic acid, or lactic acid are preferably contained as a part or the whole of the pH adjuster since the pH buffering effect can be more stably obtained.

Specific examples of saccharides include glucose, mannose, fructose, ribose, xylose, arabinose, galactose, aldonic acid, glucitol (sorbitol), maltose, cellobiose, lactose, sucrose, trehalose, and maltotriose.

Examples of the chelating agent include ethylenediaminetetraacetic acid and salts thereof (such as ethylenediaminetetraacetic acid dihydrogen disodium salt, ethylene diamine nitrilotriacetate, hexametaphosphate, pyrophosphate, and metaphosphate).

Examples of the preservative and the fungicide include sodium benzoate, sodium pentachlorophenolate, sodium 2-pyridinethiol-1-oxide, sodium sorbate, sodium dehydroacetate, PROXEL CRL, PROXEL BDN, PROXEL GXL, PROXEL XL-2, PROXEL IB, and PROXEL TN (trade names, all manufactured by LONZA KK.), and 4-chloro-3-methylphenol (such as PREVENTOL CMK manufactured by Bayer AG).

Examples of the rust inhibitor include benzotriazole, acidic sulfite, sodium thiosulfate, ammonium thioglycolic acid, diisopropylammonium nitrite, pentaerythritol tetranitrate, and dicyclohexylammonium nitrite. Among these, benzotriazole is particularly suitable.

Examples of other additives include a viscosity modifier, an antifungal agent, an antioxidant, and an oxygen absorber.

In the reaction liquid composition, the content of the coloring material is preferably 0.1% by mass or less with respect to the total amount of the reaction liquid composition. That is, it is preferable that the reaction liquid composition is not used with the intention of coloring.

1.2.1. (4) Manufacturing and Physical Properties

When the reaction liquid composition is attached to the fabric by an ink jet method, the viscosity of the composition at 20° C. is preferably 1.5 mPa·s or more and 15 mPa·s or less, more preferably 1.5 mPa·s or more and 7 mPa·s or less, and even more preferably 1.5 mPa·s or more and 5.5 mPa·s or less.

The surface tension of the reaction liquid composition at 25° C. is 40 mN/m or less, preferably 38 mN/m or less, more preferably 35 mN/m or less, and even more preferably 30 mN/m or less from the viewpoint of ensuring appropriate wet spreadability to the fabric. In addition, the surface tension is preferably 20 mN/m or more, and more preferably 25 mN/m or more.

The surface tension can be measured by confirming the surface tension when a platinum plate is wetted with the composition in an environment of 25° C. using an automatic surface tensiometer CBVP-Z (manufactured by Kyowa Interface Science, Co., Ltd.).

The reaction liquid composition is obtained by mixing the components described above in an arbitrary order and, as necessary, carrying out filtration or the like to remove impurities. As a method of mixing each component, a method of sequentially adding materials to a container equipped with a stirring device such as a mechanical stirrer and a magnetic stirrer, and performing stirring and mixing is suitably used. As a filtration method, centrifugal filtration, filter filtration, and the like can be performed as necessary.

1.2.2. Attachment Form

The reaction liquid attachment step is performed by an ink jet method, a spraying method, an immersion method, or the like. As the method of attaching the reaction liquid to the fabric, it is preferable to use any one of an ink jet method and a method of applying the reaction liquid to the fabric using various sprays or a combination of these methods.

The reaction liquid attachment step is preferably performed by an ink jet method. In such a case, the viscosity at 20° C. is preferably 1.5 mPa·s or more and 15 mPa·s or less, more preferably 1.5 mPa·s or more and 7 mPa·s or less, and even more preferably 1.5 mPa·s or more and 5.5 mPa·s or less. When the reaction liquid is attached to the fabric by the ink jet method, it is easy to efficiently form a predetermined reaction liquid attachment region on the fabric.

The attachment amount of the reaction liquid composition in the reaction liquid attachment step is preferably 10 g/m$^2$ or more and 80 g/m$^2$ or less, more preferably 15 g/m$^2$ or more and 60 g/m$^2$ or less, and even more preferably 20 g/m$^2$ or more and 40 g/m$^2$ or less. In this manner, the bleeding of the treatment liquid can be further suppressed. In addition, since the reaction liquid can be applied at the minimum required amount, the original water absorptivity and texture of the fabric can be appropriately maintained. Further, a colored image having favorable color developability can be obtained.

The reaction liquid composition can aggregate at least one of the components of the black ink composition and the coating liquid composition.

1.3. Ink Attachment Step

In the ink attachment step, a black ink composition containing a black pigment and water is attached to the fabric by an ink jet method.

1.3.1. Black Ink Composition

The black ink composition contains a black pigment and water.

1.3.1. (1) Black Pigment

Examples of the black pigment include carbon black, aniline black, and the like, and specific examples thereof include carbon blacks such as No. 2300, No. 900, MCF88, No. 33, No. 40, No. 45, No. 52, MA7, MA8, MA100, No. 2200B, and the like (hereinabove, manufactured by Mitsubishi Chemical Corporation); Raven 5750, Raven 5250, Raven 5000, Raven 3500, Raven 1255, Raven 700, and the like (hereinabove, manufactured by Columbia Carbon Company), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K.K.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and the like (hereinabove, manufactured by Degussa Corporation).

Suitably, the black pigment can be stably dispersed in a dispersion medium, and for this purpose, a dispersant may be used to disperse the black pigment. As the dispersant, there is provided a resin dispersant and the like, and the dispersant is selected from those that can improve dispersion stability of the pigment in the ink composition. In addition, the pigment may also be used as a self-dispersing pigment by modifying the surface of the pigment particles by oxidizing or sulfonating the pigment surface with, for example, ozone, hypochlorous acid, fuming sulfuric acid, or the like.

Examples of the resin dispersant (dispersant resin) include (meth)acrylic resins such as poly(meth)acrylic acid, (meth) acrylic acid-acrylonitrile copolymers, (meth)acrylic acid-(meth)acrylic acid ester copolymers, vinyl acetate-(meth) acrylic acid ester copolymers, vinyl acetate-(meth)acrylic acid copolymers, and vinyl naphthalene-(meth)acrylic acid copolymers, and salts thereof; styrene-based resins such as styrene-(meth)acrylic acid copolymers, styrene-(meth) acrylic acid-(meth)acrylic acid ester copolymers, styrene-α-methylstyrene-(meth)acrylic acid copolymers, styrene-α-methylstyrene-(meth)acrylic acid-(meth)acrylic acid ester copolymers, styrene-maleic acid copolymers, and styrene-maleic acid anhydride copolymers, and salts thereof; urethane-based resins, which are polymer compounds (resins) having a urethane bond formed when an isocyanate group reacts with a hydroxyl group, and which may be linear and/or branched regardless of a crosslinked structure, and salts thereof; polyvinyl alcohols; vinyl naphthalene-maleic acid copolymers and salts thereof; vinyl acetate-maleic acid ester copolymers and salts thereof; and water-soluble resins such as vinyl acetate-crotonic acid copolymers and salts thereof. Among these, a copolymer of a monomer having a hydrophobic functional group and a monomer having a hydrophilic functional group, and a polymer formed of monomers having both a hydrophobic functional group and a hydrophilic functional group are preferable. As the form of the copolymer, any form of a random copolymer, a block copolymer, an alternating copolymer, and a graft copolymer can be used.

Examples of commercially available products of the styrene-based resin dispersant include X-200, X-1, X-205, X-220, and X-228 (manufactured by SEIKO PMC CORPORATION), NOPCOSPERSE (registered trademark) 6100 and 6110 (manufactured by SAN NOPCO LIMITED), Joncryl 67, 586, 611, 678, 680, 682, and 819 (manufactured by BASF SE), DISPER BYK-190 (manufactured by BYK Japan KK.), and N-EA137, N-EA157, N-EA167, N-EA177, N-EA197D, N-EA207D, and E-EN10 (manufactured by DKS Co., Ltd.).

In addition, examples of commercially available products of the acrylic resin dispersants include BYK-187, BYK-190, BYK-191, BYK-194N, and BYK-199 (manufactured by BYK Japan KK.), and Aron A-210, A6114, AS-1100, AS-1800, A-30SL, A-7250, and CL-2 (manufactured by TOAGOSEI CO., LTD.).

Further, examples of commercially available products of the urethane-based resin dispersant include BYK-182, BYK-183, BYK-184, and BYK-185 (manufactured by BYK Japan KK.), TEGO Dispers 710 (manufactured by Evonik Tego Chemi GmbH), and Borchi (registered trademark) Gen 1350 (manufactured by OMG Borchers GmbH).

These dispersants may be used alone or in combination of two or more thereof. The total content of the dispersant is preferably 0.1 parts by mass or more and 30 parts by mass or less, more preferably 0.5 parts by mass or more and 25 parts by mass or less, even more preferably 1 part by mass or more and 20 parts by mass or less, and still even more preferably 1.5 parts by mass or more and 15 parts by mass or less with respect to 50 parts by mass of the black pigment. When the content of the dispersant is 0.1 parts by mass or more with respect to 50 parts by mass of the pigment, the dispersion stability of the black pigment can be further enhanced. In addition, when the content of the dispersant is 30 parts by mass or less with respect to 50 parts by mass of the pigment, the viscosity of the obtained dispersion can be suppressed to be small.

By using such a resin dispersant as the dispersant, the dispersion and aggregation properties of the black pigment are further improved, and an image having more favorable dispersion stability and more favorable image quality can be obtained.

The dispersant resin preferably has an acid value, and the acid value is preferably 5 mg KOH/g or more, more preferably 10 to 200 mg KOH/g, and even more preferably 15 to 150 mg KOH/g. Further, an acid value of 20 to 100 mg KOH/g is preferable, and an acid value of 25 to 70 mg KOH/g is more preferable.

The acid value can be measured by the neutralization titration method in accordance with JIS K 0070. As a titration device, for example, "AT610" manufactured by Kyoto Electronics Manufacturing Co., Ltd. can be used.

The content of the black pigment is preferably 0.3% by mass or more and 20% by mass or less, and more preferably 0.5% by mass or more and 15% by mass or less with respect to the total mass of the black ink composition. Further, the content is preferably 1% by mass or more and 10% by mass or less, and more preferably 2% by mass or more and 7% by mass or less.

1.3.1. (2) Water

The ink composition includes water. Regarding water, the content thereof is the same as that of the reaction liquid composition described above, and thus the description thereof will be omitted.

1.3.1. (3) Other Components

The black ink composition may contain anionic resin particles, a moisturizing agent, a solvent, a surfactant, an additive, and the like, in addition to the pigment and water. The moisturizing agent, the solvent, the surfactant, and the additive are the same as those already described, and thus the description thereof will be omitted.

The black ink composition contains anionic resin particles. The resin particles can further improve the adhesion of an image or the like due to the composition attached to the fabric. As the anionic resin particles, for example, there may be mentioned resin particles having anionic properties among resin particles formed of a urethane-based resin, an acrylic resin (including styrene-acrylic resin), a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, an ethylene vinyl acetate-based resin, a silicone-acrylic resin, and the like. Among these, a urethane-based resin, a silicone-acrylic resin, an acrylic resin, a polyolefin-based resin, and a polyester-based resin are preferable. These resin particles are often handled in the form of an emulsion, but may be in the form of powder. In addition, the resin particles can be used alone or in combination of two or more thereof.

Urethane-based resin is a generic term for resins having a urethane bond. For the urethane-based resin, a polyether-type urethane resin including an ether bond in the main chain, a polyester-type urethane resin including an ester bond in the main chain, a polycarbonate-type urethane resin including a carbonate bond in the main chain, and the like, in addition to a urethane bond, may be used. In addition, as the urethane-based resin, a commercially available product may be used, and for example, commercially available products such as SUPERFLEX 460, 460s, 840, and E-4000 (trade names, manufactured by DKS Co., Ltd.), RESAMINE D-1060, D-2020, D-4080, D-4200, D-6300, and D-6455 (trade names, manufactured by Dainichiseika Color & Chemicals Mfg. Co., Ltd.), Takelac WS-6021, and W-512-A-6 (trade names, manufactured by Mitsui Chemicals & SKC Polyurethanes Inc.), Sancure 2710 (trade name, manufactured by Lubrizol Corporation), PERMARIN UA-150 (trade name, manufactured by Sanyo Chemical Industries Ltd.), ETERNACOLL UW series, for example, UW-1527 or the like, (manufactured by UBE Corporation), and the like may be used.

Acrylic resin is a generic term for polymers obtained by polymerizing at least acrylic monomers such as (meth) acrylic acid and (meth)acrylic acid ester as one component, and examples thereof include a resin obtained from an acrylic monomer and a copolymer of an acrylic monomer and other monomers. Examples thereof include an acrylic-vinyl-based resin which is a copolymer of an acrylic monomer and a vinyl-based monomer, and the like. In addition, examples of the vinyl-based monomer include styrene and the like.

As the acrylic monomer, acrylamide, acrylonitrile, and the like can also be used. For the resin emulsion using acrylic resin as a raw material, a commercially available product may be used, and for example, any resin emulsion may be selected and used from FK-854 (trade name, manufactured by CHIRIKA Co., Ltd.), Mowinyl 952B, 718A, and 6760 (trade names, manufactured by Japan Coating Resin Corporation), Nipol LX852 and LX874 (trade names, manufactured by Zeon Corporation), and the like.

Incidentally, in the present specification, the acrylic resin may be a styrene-acrylic resin described below. In addition, in the present specification, the notation of "(meth)acrylic" means at least one of acrylic and methacrylic.

The styrene-acrylic resin is a copolymer obtained from a styrene monomer and a (meth)acrylic monomer, and examples thereof include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. As the styrene-acrylic resin, a commercially available product may be used, and for example, Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, manufactured by BASF SE), Mowinyl 966A and 975N (trade names, manufactured by Japan Coating Resin Corporation), VINYBLAN 2586 (manufactured by Nissin Chemical Industry Co., Ltd.), and the like may be used.

As the silicone-acrylic copolymer resin, a commercially available product can be used. Examples thereof include CHALINE series FE-230N, FE-502, E-370, RU-911, R-170, R170S, LC-190, and R-170BX, manufactured by Nissin Chemical Industry Co., Ltd., SYMAC US-380, SYMAC US-450, and SYMAC US-480, manufactured by Toagosei Co., Ltd., IE-7170, SE 1980 CLEAR, BY22-826EX, and POLON-MF-40, manufactured by Dow Corning Toray Silicone Co., Ltd., LEXAN EXL manufactured by SABIC, TARFLON NEO manufactured by Idemitsu Kosan Co., Ltd., Banstar S-806 manufactured by Saiden Chemical Industry Co., Ltd., Mowinyl manufactured by Japan Coating Resin Corporation, COATAX manufactured by Toray Fine Chemicals Co., Ltd., DAITOSOL 5000SJ manufactured by Daito Kasei Kogyo Co., Ltd., YODOSOL GH41 manufactured by N.S.C. Japan, an acrylates/ethylhexyl acrylate/dimethicone methacrylate copolymer (trade name: KP578) manufactured by Shin-Etsu Chemical Co., Ltd., BONCOAT and CERANATE manufactured by DIC Corporation, and acrylic silicone-based emulsions "SIFCLEAR S101" and "SIFCLEAR S102" manufactured by JSR Corporation.

The polyolefin-based resin has an olefin such as ethylene, propylene, or butylene in the structural skeleton, and known ones can be appropriately selected and used. As the olefin resin, a commercially available product can be used, for example, ARROWBASE CB-1200, CD-1200 (trade name, manufactured by Unitika Ltd.), and the like may be used.

In addition, the resin particles may be supplied in the form of an emulsion, and as examples of commercially available products of such a resin emulsion include Microgel E-1002 and E-5002 (trade names, manufactured by Nippon Paint Co. Ltd., styrene-acrylic resin emulsion), VONCOAT 4001 (trade name, manufactured by DIC Corporation, acrylic resin emulsion), VONCOAT 5454 (trade name, manufactured by DIC Corporation, styrene-acrylic resin emulsion), Polysol AM-710, AM-920, AM-2300, AP-4735, AT-860, and PSASE-4210E (acrylic resin emulsion), Polysol AP-7020 (styrene-acrylic resin emulsion), Polysol SH-502 (vinyl acetate resin emulsion), Polysol AD-13, AD-2, AD-10, AD-96, AD-17, and AD-70 (ethylene vinyl acetate resin emulsion), Polysol PSASE-6010 (ethylene vinyl acetate resin emulsion) (trade names, manufactured by Showa Denko KK), Polysol SAE1014 (trade name, styrene-acrylic resin emulsion, manufactured by Zeon Corporation), Saivinol SK-200 (trade name, acrylic resin emulsion, manufactured by Saiden Chemical Industry Co., Ltd.), AE-120A (trade name, manufactured by JSR Corporation, acrylic resin emulsion), AE373D (trade name, manufactured by Emulsion Technology Co., Ltd., carboxy-modified styrene-acrylic resin emulsion), Seikadyne 1900W (trade name, manufactured by Dainichiseika Color & Chemicals Mfg. Co., Ltd., ethylene vinyl acetate resin emulsion), VINYBLAN 2682 (acrylic resin emulsion), VINYBLAN 2886 (vinyl acetate acrylic resin emulsion), VINYBLAN 5202 (acetic acid acrylic resin emulsion) (trade names, manufactured by Nisshin Chemical Industry Co., Ltd.), Elitel KA-5071S, KT-8803, KT-9204, KT-8701, KT-8904, and KT-0507 (trade names, manufactured by Unitika Ltd., polyester resin emulsion), Hi-Tech SN-2002 (trade name, manufactured by TOHO CHEMICAL INDUSTRY Co., Ltd., polyester resin emulsion), TAKELAK W-6020, W-635, W-6061, W-605, W-635, W-6021, and WS-5100 (trade names, manufactured by Mitsui Chemicals & SKC Polyurethanes Inc., urethane-based resin emulsion), SUPERFLEX 870, 800, 150, 420, 460, 470, 610, and 700 (trade names, manufactured by DKS Co., Ltd., urethane-based resin emulsion), PERMARIN UA-150 (manufactured by Sanyo Chemical Industries, Ltd., urethane-based resin emulsion), Sancure 2710 (manufactured by Japanese Lubrizol Corporation, urethane-based resin emulsion), NeoRez R-9660, R-9637, and R-940 (manufactured by Kusumoto Chemicals, Ltd., urethane-based resin emulsion), ADEKA BONTIGHTER HUX-380 and 290K (manufactured by ADEKA Corporation, urethane-based resin emulsion), Mowinyl 966A and Mowinyl 7320 (manufactured by Japan Coating Resin Corporation), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (manufactured by BASF SE), NK binder R-5HN (manufactured by Shin-Nakamura Chemical Co., Ltd.), HYDRAN WLS-210 (non-crosslinkable polyurethane: manufactured by DIC Corporation), and Joncryl 7610 (manufactured by BASF SE). Any of these may be selected and used.

When the black ink composition contains anionic resin particles, the content of the resin particles is preferably 20% by mass or more with respect to the total amount of the non-volatile components. The content of the resin particles in the black ink composition is more preferably 30% by mass or more, and even more preferably 40% by mass or more with respect to the total amount of the non-volatile components.

1.3.1. (4) Manufacturing and Physical Properties

When the black ink composition is attached to the fabric by an ink jet method, the viscosity of the composition at 20° C. is preferably 1.5 mPa·s or more and 15 mPa·s or less, more preferably 1.5 mPa·s or more and 7 mPa·s or less, and even more preferably 1.5 mPa·s or more and 5.5 mPa·s or less.

The surface tension of the black ink composition at 25° C. is 40 mN/m or less, preferably 38 mN/m or less, more preferably 35 mN/m or less, and even more preferably 30 mN/m or less from the viewpoint of ensuring appropriate wet spreadability to the fabric. In addition, the surface tension is preferably 20 mN/m or more, and more preferably 25 mN/m or more.

The black ink composition is obtained by mixing the components described above in an arbitrary order and, as necessary, carrying out filtration or the like to remove impurities. As a method of mixing each component, a method of sequentially adding materials to a container equipped with a stirring device such as a mechanical stirrer and a magnetic stirrer, and performing stirring and mixing is suitably used. As a filtration method, centrifugal filtration, filter filtration, and the like can be performed as necessary.

1.3.2. Attachment Form

The ink attachment step is performed by an ink jet method. Any one of the ink attachment step, the coating liquid attachment step, and the treatment liquid attachment step may be performed first on a predetermined region of the fabric and the ink attachment step, the coating liquid attachment step, and the softening liquid attachment step may be performed at the same time.

The attachment amount of the black ink composition in the ink attachment step is preferably 15 $g/m^2$ or more and 120 $g/m^2$ or less, more preferably 30 $g/m^2$ or more and 80 $g/m^2$ or less, and even more preferably 30 $g/m^2$ or more and 60 $g/m^2$ or less. In this manner, the bleeding of the treatment liquid can be further suppressed. In addition, since the reaction liquid can be applied at the minimum required amount, the original water absorptivity and texture of the fabric can be appropriately maintained. Further, a colored image having favorable color developability can be obtained.

1.4. Coating Liquid Attachment Step

In the coating liquid attachment step, a coating liquid composition containing anionic resin particles and water is attached to the fabric.

1.4.1. Coating Liquid Composition

The coating liquid composition contains anionic resin particles and water. The anionic resin particles and water are the same as described above, and the description thereof will be omitted.

1.4.1. (1) Other Components

The coating liquid composition may contain a water-soluble resin, a wax, a moisturizing agent, other solvents, an additive, a surfactant, and the like, in addition to the anionic resin particles and water. The moisturizing agent, other solvents, and the additive are the same as described above, and the description thereof will be omitted.

The coating liquid composition may contain a resin. The resin is preferably a water-soluble resin. Examples of the water-soluble resin include, although not particularly limited, carboxymethyl cellulose, hydroxyethyl cellulose, polyvinylpyrrolidone, polyethylene oxide, and acrylic resins containing an oxazoline group. The polyvinylpyrrolidone is not limited to a homopolymer, and a copolymer of vinylpyrrolidone and other monomers may be used. Examples of commercially available products of polyvinylpyrrolidone include polyvinyl pyrrolidone K-30 and K-30W (hereinabove, all product names, manufactured by Nippon Shokubai Co., Ltd.), PITZCOL (registered trademark) K-17L, K-30, K-30L, and K-30AL, K-60L, K-30, K-50, K-90 CREEJUS (registered trademark) K-30, and AIPHTACT (registered trademark) K-30PH (hereinabove, all product names, manufactured by DKS Co., Ltd.), and PVP K-30, PVP K-25, and PVP K-17 (trade names, manufactured by Ashland). Further, examples of the acrylic resins containing an oxazoline group include EPOCROS (registered trademark) K-2010, K-2020, K-2030, K-2035E, WS-300, WS-500, and WS-700 (all trade names, Nippon Shokubai Co., Ltd.).

Examples of the wax include, although not particularly limited, a hydrocarbon wax and an ester wax which is a condensate of fatty acid and monohydric alcohol or polyhydric alcohol. Although not particularly limited, examples of the hydrocarbon wax include a paraffin wax and polyolefin waxes such as polyethylene wax and polypropylene wax. These waxes may be used alone or in combination of two or more thereof. Among these waxes, the hydrocarbon wax is preferable, the polyolefin wax is more preferable, and the polyethylene wax is even more preferable from the viewpoint of improving the abrasion resistance. The wax may be, for example, in an emulsion state in which the wax particles are dispersed in water.

In the coating liquid composition, the content of the coloring material is preferably 0.1% by mass or less with respect to the total amount of the coating liquid composition. That is, it is preferable that the coating liquid composition is not used with the intention of coloring.

1.4.1. (2) Manufacturing and Physical Properties

When the coating liquid composition is attached to the fabric by an ink jet method, the viscosity of the composition at 20° C. is preferably 1.5 mPa·s or more and 15 mPa·s or less, more preferably 1.5 mPa·s or more and 7 mPa·s or less, and even more preferably 1.5 mPa·s or more and 5.5 mPa·s or less.

The surface tension of the coating liquid composition at 25° C. is 40 mN/m or less, preferably 38 mN/m or less, more preferably 35 mN/m or less, and even more preferably 30 mN/m or less from the viewpoint of ensuring appropriate wet spreadability to the fabric. In addition, the surface tension is preferably 20 mN/m or more, and more preferably 25 mN/m or more.

The coating liquid composition is obtained by mixing the components described above in an arbitrary order and, as necessary, carrying out filtration or the like to remove impurities. As a method of mixing each component, a method of sequentially adding materials to a container equipped with a stirring device such as a mechanical stirrer and a magnetic stirrer, and performing stirring and mixing is suitably used. As a filtration method, centrifugal filtration, filter filtration, and the like can be performed as necessary.

1.4.2. Attachment Form

The coating liquid attachment step is performed by an ink jet method. The coating liquid attachment step is performed before the treatment liquid attachment step. A time difference from when the coating liquid composition is attached by the coating liquid attachment step to when the treatment liquid composition is attached to a region to which the coating liquid composition is attached by the treatment liquid attachment step is 60 seconds or shorter. The coating liquid attachment step may be performed by the same main scanning as in the treatment liquid attachment step, or the coating liquid attachment step may be performed by a main scanning different from the main scanning of the treatment liquid attachment step.

The attachment amount of the coating liquid composition in the coating liquid attachment step is preferably 10 g/m$^2$ or more and 80 g/m$^2$ or less, more preferably 15 g/m$^2$ or more and 60 g/m$^2$ or less, and even more preferably 20 g/m$^2$ or more and 40 g/m$^2$ or less. In this manner, the bleeding of the treatment liquid can be further suppressed. In addition, since the reaction liquid can be applied at the minimum required amount, the original water absorptivity and texture of the fabric can be appropriately maintained. Further, a colored image having favorable color developability can be obtained.

1.5. Treatment Liquid Attachment Step

In the treatment liquid attachment step, a treatment liquid composition, which contains any specific substance selected from particles containing forcibly emulsified organopolysiloxane and an aliphatic ester, and water, and does not contain a coloring material or has a coloring material content of 0.1% by mass or less with respect to a total amount of the treatment liquid composition, is attached to the fabric by an ink jet method.

1.5.1. Treatment Liquid Composition

The treatment liquid composition contains any specific substance selected from particles containing forcibly emulsified organopolysiloxane and an aliphatic ester, and water, and the content of the specific substance is increased in the treatment liquid composition, is 60% by mass or more with respect to the total amount of non-volatile components in the above.

1.5.1. (1) Specific Substance

The specific substance is selected from particles containing forcibly emulsified organopolysiloxane and an aliphatic ester. The specific substance can function as a color developing agent.

Particle Containing Organopolysiloxane

The particles containing organopolysiloxane are not particularly limited as long as the particles contain organopolysiloxane, and may be, for example, particles of organopolysiloxane itself or particles in a state in which the organopolysiloxane is dispersed with an emulsifier or the like. The property of the organopolysiloxane in the particles may be a solid or a liquid. For example, when an oily organopolysiloxane is forcibly dispersed in water in the form of particles by an emulsifier, the dispersed particles correspond to particles containing organopolysiloxane.

Organopolysiloxane is a generic term for organic silicon compounds having a siloxane bond "—Si($R^1R^2$)—O—" as a skeleton, in which a methyl group, a phenyl group, a vinyl group, an amino group, or the like is bonded to the siloxane bond as organic groups $R^1$ and $R^2$. Due to the chemical composition and the molecular weight, the organopolysiloxane exhibits oil-like (oily), rubber-like, or resin-like properties, and is referred to as silicone oil, silicone rubber, or silicone resin, respectively.

The organopolysiloxane used in the treatment liquid composition of the present embodiment is more preferably an oily compound. When the organopolysiloxane is an oily compound, the organopolysiloxane is easily stably dispersed in the form of particles in an aqueous matrix by a forced emulsification treatment described below.

The molecular structure of the organopolysiloxane is not particularly limited, and a linear structure, a branched structure, a cyclic structure, a grid-like structure, a cage-like structure, and the like can be exemplified. When the molecular structure of the organopolysiloxane is an acyclic structure, usually, one or two or more groups selected from a hydrocarbon group, an alkoxy group, a hydroxyl group, a hydrogen atom, and a halogen, which may have a substituent, are bonded to the terminal Si atom of this molecule.

The organopolysiloxane is not particularly limited, and examples thereof include dimethyl silicone, alkyl-modified silicone, amino-modified silicone, epoxy-modified silicone, cyclic silicone, and methyl phenyl silicone. These may be used alone or as a mixture of two or more thereof.

In addition, as the organopolysiloxane, those commercially available as silicone oils may be used. Examples thereof include dimethyl silicone oil, methyl phenyl silicone oil, methyl hydrogen silicone oil, polyether-modified silicone oil, aralkyl-modified silicone oil, fluoroalkyl-modified silicone oil, long-chain alkyl-modified silicone oil, higher fatty acid ester-modified silicone oil, higher fatty acid amide-modified silicone oil, polyether/long-chain alkyl/aralkyl-modified silicone oil, long-chain alkyl/aralkyl-modified silicone oil, phenyl-modified silicone oil, and polyether/methoxy-modified silicone oil.

In addition, among the above-exemplified organopolysiloxanes, it is more preferable that the organopolysiloxane is a nonionic silicone. In addition, among the above-exemplified organopolysiloxanes, it is more preferable that the organopolysiloxane is an unmodified silicone. Such organopolysiloxanes are chemically more stable and are less likely to cause yellowing or the like of an image to be formed.

Further, the organopolysiloxane is more preferably one or more selected from dimethyl silicone, methyl phenyl silicone, and methyl hydrogen silicone.

Examples of commercially available products of silicone oils include dimethyl silicone (KF-96 series, manufactured by Shin-Etsu Chemical Co., Ltd.), methyl hydrogen type polysiloxane (KF-99 series, KF-9901, and the like, manufactured by Shin-Etsu Chemical Co., Ltd.), methyl phenyl silicone (KF-50 series and the like, manufactured by Shin-Etsu Chemical Co., Ltd.), amino-modified silicone (KF-868, and the like, manufactured by Shin-Etsu Chemical Co., Ltd.), and silicone-branched silicone treatment agents (KF-9908, KF-9909, and the like, manufactured by Shin-Etsu Chemical Co., Ltd.).

For example, the viscosity of the silicone at 25° C. is not particularly limited, and the viscosity is preferably 1000 mPa·s or less, more preferably 50 mPa·s or more, even more preferably 500 mPa·s or more and 900 mPa·s or less, and still even more preferably 600 mPa·s or more and 700 mPa·s or less. In addition, the base oil viscosity when the silicone is emulsified and dispersed is not particularly limited, and the upper limit is preferably 1,000,000 $mm^2$/s or less, and more preferably 100,000 $mm^2$/s or less, and the lower limit is preferably 10 $mm^2$/s or more, and more preferably 100 $mm^2$/s or more. The base oil viscosity indicates the viscosity of the base oil and is a numerical value obtained by measuring the magnitude of the internal resistance of the base oil. The higher the numerical value of the base oil viscosity, the higher the viscosity, and the smaller the numerical value, the lower the viscosity of the base oil.

The organopolysiloxane may be blended in the form of particles by emulsifying various surfactants as emulsifiers. In the present specification, this may be referred to as forced emulsification. As the emulsifier at that time, for example, a nonionic surfactant, a negative ion (anionic) surfactant, a positive ion (cationic) surfactant, an amphoteric surfactant, a phospholipid, or the like can be used.

Examples of the nonionic surfactant include glycerin fatty acid esters, polyglycerin fatty acid esters, propylene glycol fatty acid esters, sorbitan fatty acid esters, fatty acid esters of sorbitol and alkylene glycol adducts thereof, polyalkylene glycol fatty acid esters, sucrose fatty acid esters, polysorbate 20, polysorbate 60, polysorbate 80, polyoxyalkylene alkyl ethers, and polyoxyethylene alkylphenyl ethers.

In addition, as the nonionic surfactant, for example, nonionic surfactants such as polyoxyethylene glycerin fatty acid ester, polyglycerin fatty acid esters, sorbitan fatty acid ester, polyoxyethylene sorbitan fatty acid ester, polyoxyethylene sorbit fatty acid ester, polyethylene glycol fatty acid ester, polyoxyethylene castor oil, polyoxyethylene hardened castor oil, polyoxyethylene phytosterol, polyoxyethylene polyoxypropylene alkyl ether, polyoxyethylene lanolin, polyoxyethylene lanolin alcohol, polyoxyethylene beeswax derivatives, polyoxyethylene alkylamine, polyoxyethylene fatty acid amide, polyoxyethylene alkylphenyl formaldehyde condensates, polyoxyethylene alkyl ether phosphoric acid (salt), and the like are suitably used.

Examples of the anionic surfactant include alkyl sulfate ester salt, polyoxyethylene alkyl sulfate ester salt, alkyl benzene sulfonate, and α-olefin sulfonate. Examples of the cationic surfactant include alkyltrimethylammonium chloride, dialkyldimethylammonium chloride, and benzalkonium chloride. Examples of the amphoteric surfactant include alkyl dimethyl aminoacetic acid betaine, and alkyl amido dimethyl aminoacetic acid betaine. Further, naturally derived surfactants may be used, and examples thereof include lecithin, lanolin, cholesterol, and saponin.

The blending amount of the emulsifier when emulsifying the organopolysiloxane is preferably less than 20% by mass, more preferably 15% by mass or less, and particularly preferably 10% by mass or less, of the total amount of the emulsion composition.

In addition, it is desirable that the average particle diameter of the particles of the emulsified particulate organopolysiloxane is 2 μm or less, preferably 1 μm or less, and more preferably within a range of 0.05 to 0.5 μm.

Fatty Acid Ester

Examples of the fatty acid ester include polyoxyethylene monocaprate, polyoxyethylene monocaprylate, polyoxyethylene monolaurate, polyoxyethylene monomyristylate, polyoxyethylene monopalmitate, polyoxyethylene monostearate, polyoxyethylene monooleate, polyoxyethylene monostearate, polyoxyethylene monobehenate, polyoxyethylene dicaprate, polyoxyethylene dicaprylate, polyoxyethylene dilaurate, polyoxyethylene dimyristylate, polyoxyethylene dipalmitate, polyoxyethylene distearate, polyoxyethylene dioleate, polyoxyethylene diisostearate, and polyoxyethylene dibehenate.

In addition, the specific substance is more preferably at least one selected from particles containing forcibly emulsified organopolysiloxane. Accordingly, since a water repellent effect can be imparted to the fibers of the fabric by the treatment liquid composition, the rubbing fastness of the image of the recorded matter can further improved.

In addition, when the particles containing organopolysiloxane are selected as the specific substance, the organopolysiloxane is more preferably a nonionic silicone. Accordingly, the yellowing of the recorded matter can be further reduced.

In addition, when the particles containing organopolysiloxane are selected as the specific substance, the organopolysiloxane is also preferably an amino-modified silicone. In this manner, the bleeding of the treatment liquid can be further suppressed.

The content of the specific substance in the treatment liquid composition is 60% by mass or more, more preferably 65% by mass or more, and even more preferably 70% by mass or more with respect to the total amount of the non-volatile components in the treatment liquid composition.

1.5.1. (2) Water

The treatment liquid composition includes water. Regarding water, the content thereof is the same as that of the reaction liquid composition described above, and thus the description thereof will be omitted.

1.5.1. (3) Other Components

The treatment liquid composition may include, in addition to the specific substance and water, anionic resin particles, a water-soluble resin, a moisturizing agent, a solvent, a surfactant, an additive, and the like. The anionic resin particles, the water-soluble resin, the moisturizing agent, the solvent, the surfactant, and the additive are the same as those already described, and thus the description thereof will be omitted.

When the treatment liquid composition contains surfactants, it is more preferable that all of the surfactants have an HLB value of 8 or more. As the surfactant, those described above can be used, and among the above-described surfactants, those having an HLB value of 8 or more are preferably used. In this manner, the storage stability of the treatment liquid composition can be further improved. One reason for this is considered to be that a surfactant having a low HLB value is easily absorbed by hydrophobic particles, and the absorption of other surfactants is inhibited to impair the dispersion stability of the particles. However, by using a surfactant having a HLB value of 8 or more, the storage stability of the treatment liquid composition can be further improved.

In the treatment liquid composition, the content of the coloring material is preferably 0.1% by mass or less with respect to the total amount of the treatment liquid composition. That is, it is preferable that the treatment liquid composition is not used with the intention of coloring.

1.5.1. (4) Manufacturing and Physical Properties

When the treatment liquid composition is attached to the fabric by an ink jet method, the viscosity of the composition at 20° C. is preferably 1.5 mPa·s or more and 15 mPa·s or less, more preferably 1.5 mPa·s or more and 7 mPa·s or less, and even more preferably 1.5 mPa·s or more and 5.5 mPa·s or less.

The surface tension of the treatment liquid composition at 25° C. is 40 mN/m or less, preferably 38 mN/m or less, more preferably 35 mN/m or less, and even more preferably 30 mN/m or less from the viewpoint of ensuring appropriate wet spreadability to the fabric. In addition, the surface tension is preferably 20 mN/m or more, and more preferably 25 mN/m or more.

The surface tension can be measured by confirming the surface tension when a platinum plate is wetted with the composition in an environment of 25° C. using an automatic surface tensiometer CBVP-Z (manufactured by Kyowa Interface Science, Co., Ltd.).

The treatment liquid composition is obtained by mixing the components described above in an arbitrary order and, as necessary, carrying out filtration or the like to remove impurities. As a method of mixing each component, a method of sequentially adding materials to a container equipped with a stirring device such as a mechanical stirrer and a magnetic stirrer, and performing stirring and mixing is suitably used. As a filtration method, centrifugal filtration, filter filtration, and the like can be performed as necessary.

1.5.2. Attachment Form

The treatment liquid attachment step is performed by an ink jet method. For example, when the treatment liquid attachment step is performed by an ink jet method, the treatment liquid attachment step may be performed, for example, by the same scanning as in the coating liquid attachment step, or the coating liquid attachment step may be performed by a main scanning different from the main scanning of the treatment liquid attachment step. In addition, when the treatment liquid attachment step is performed by the same scanning as in the coating liquid attachment step, either the treatment liquid composition or the coating liquid composition may first land on the recording medium.

The attachment amount of the treatment liquid composition in the treatment liquid attachment step is preferably 5 g/m$^2$ or more and 100 g/m$^2$ or less, more preferably 10 g/m$^2$ or more and 70 g/m$^2$ or less, and even more preferably 15 g/m$^2$ or more and 40 g/m$^2$ or less. In this manner, the bleeding of the treatment liquid can be further suppressed. In addition, since the reaction liquid can be applied at the minimum required amount, the original water absorptivity and texture of the fabric can be appropriately maintained. Further, an image having favorable color developability can be obtained.

1.6. Other Steps

Drying Step

The recording method according to the present embodiment may include a drying step between or before and after each step described above. The drying step can be performed by a unit that performs drying using a drying mechanism. Examples of the unit that performs drying using a drying mechanism include a unit that blows normal temperature air or warm air onto the fabric (ventilation type), a unit that irradiates the fabric with radiation (such as infrared rays) which generates heat, (radiation type), a member that comes into contact with the fabric and conducts heat to the fabric (conduction type), and a combination of two or more of these units. When the recording method has the drying step, it is preferable to perform the drying step by a drying mechanism that heats the fabric. A case in which the drying mechanism that heats the fabric is used as the drying mechanism is particularly referred to as a heating step.

The surface temperature of the fabric at the time of attaching each composition to the recording medium is preferably 45° C. or lower, and more preferably 10° C. or higher and 45° C. or lower. Further, the surface temperature is preferably 15° C. or higher and 40° C. or lower, and more preferably 20° C. or higher and 30° C. or lower. The temperature is a surface temperature of the portion of the recording surface of the fabric, on which liquid attachment is applied in the attachment step, and is the highest temperature of the attachment step in the recording region. When the surface temperature is within the above range, the surface temperature is more preferably from a viewpoint of image quality, abrasion resistance, and suppression of clogging.

The method of heating the fabric is not particularly limited, and examples thereof include a heat press method, a normal pressure steam method, a high pressure steam method, and a thermofix method. A heat source at the time of heating is not particularly limited, and for example, an infrared lamp and the like can be used. The heating temperature is preferably a temperature at which resin particles in the ink are fused and the medium such as moisture volatilizes. For example, the heating temperature is preferably 100° C. or higher and 200° C. or lower, more preferably 170° C. or lower, and even more preferably 160° C. or lower. Here, the heating temperature in the heating step refers to a surface temperature of an image and the like formed at a fabric. The time for performing heating is not particularly limited, and is, for example, 30 seconds or more and 20 minutes or less.

In addition, it is also preferable not to have a drying step. Accordingly, an image having favorable color development can be obtained in a shorter time.

1.7. Timing and Order of Each Step

In the recording method of the present embodiment, the coating liquid attachment step is performed before the treatment liquid attachment step. Then, the time difference from when the coating liquid composition is attached by the coating liquid attachment step to when the treatment liquid composition is attached to a region to which the coating liquid composition is attached by the treatment liquid attachment step is 60 seconds or shorter.

When the treatment liquid composition is mixed with the coating liquid composition, the treatment liquid composition may inhibit the aggregation reaction of the coating liquid composition and the reaction liquid composition (since containing a large amount of the emulsifier due to forced emulsification), and dry rubbing fastness of the image may be less likely to be improved. Therefore, in the recording method of the present embodiment, the coating liquid composition is applied before the treatment liquid composition, an aggregation reaction is caused to thicken the coating liquid composition, and then the treatment liquid composition is applied. As a result, the coating liquid composition remains on the base, the substrate can be sufficiently coated, and thus the dry rubbing fastness is improved. On the other hand, when the time difference is too long, the coating liquid composition is completely thickened, and even when the treatment liquid composition is attached, the thickened coating liquid composition is not diffused into the treatment liquid composition. Thus, the treatment liquid composition is not thickened. In this case, the treatment liquid composition is likely to bleed. However, in the recording method of the present embodiment, since the time difference between the attachment of the coating liquid composition and the attachment of the treatment liquid composition is 60 seconds or shorter, the bleeding of the treatment liquid composition can be suppressed.

It is preferable that the time difference from when the coating liquid composition is attached by the coating liquid attachment step to when the treatment liquid composition is attached to a region to which the coating liquid composition is attached by the treatment liquid attachment step is 1 second or shorter.

When the time difference between the attachment of the coating liquid composition and the attachment of the treatment liquid composition is too long, the coating liquid composition is completely thickened, and even when the treatment liquid composition is attached, the thickened coating liquid composition is less likely to be diffused into the treatment liquid composition. Thus, the treatment liquid composition is less likely to be thickened. In this case, the treatment liquid composition is likely to bleed. According to the recording method, by setting the time difference between the attachment of the coating liquid and the attachment of the treatment liquid to 1 second or shorter, the bleeding of the treatment liquid can be further suppressed.

The recording method of the present embodiment may further include a second coating liquid attachment step of attaching the treatment liquid composition by the treatment liquid attachment step and then attaching the coating liquid composition on a region to which the treatment liquid composition is attached. The coating liquid attachment step, the treatment liquid attachment step, and the second coating liquid attachment step may be performed in the same scanning.

According to the recording method, the bleeding-out of the treatment liquid composition which is less likely to aggregate with respect to the reaction liquid can be covered with the coating liquid composition which easily aggregates with the reaction liquid composition. That is, by sandwiching the treatment liquid composition between the coating films of the coating liquid composition, the bleeding of the treatment liquid composition can be further suppressed.

On the other hand, the time from the start to the end of the treatment liquid attachment step is more preferably 25 seconds or longer with respect to a predetermined region of the fabric. Further, the time is more preferably 30 seconds or longer, and further more preferably 40 seconds or longer.

In this manner, since the time from the start to the end of the treatment liquid attachment step can be extended, the time for thickening due to evaporation of moisture or mixing and diffusion of the reaction liquid composition and the ink composition or the coating liquid composition can be sufficiently secured. Due to this, aggregation of the ink composition and the coating liquid composition further proceeds, and thus the bleeding of the treatment liquid composition can be further suppressed.

Here, the "predetermined region" refers to a region of 1 inch square where the nozzle row scans in one main scanning by the recording method in which the head is scanned (main scanning) in a direction perpendicular to the transport direction of the fabric. The required application amount of the treatment liquid composition may not be achieved by one main scanning, and a coating method in which the attachment is completed by substantially 4 times of main scanning per unit area can be considered. The time from the start to the end of the treatment liquid attachment step in this case is the time from the start of attachment to the completion of the last main scanning, and this time is preferably 25 seconds or longer.

The ink attachment step is preferably performed before the coating liquid attachment step. By doing so, a printed textile having further favorable dry rubbing fastness can be obtained.

2. Example of Recording Apparatus

An example of an ink jet textile printing apparatus (recording apparatus) which includes an ink jet head and which is configured to be applicable to the recording method according to the present embodiment will be described with reference to FIG. 1.

In addition, the scales of each layer and each member shown in FIG. 1 are made different from the actual scales thereof so as to be visually recognized in the drawing. In addition, for the convenience of illustration in FIG. 1, as three axes orthogonal to each other, an X axis, a Y axis, and a Z axis are shown, a front end side of each arrow indicating an axial direction shown in the drawing is represented by "+ side", and a base end side thereof is represented by "− side". A direction parallel to the X axis, a direction parallel to the Y axis, and a direction parallel to the Z axis are represented by "X axis direction", "Y axis direction", and "Z axis direction", respectively.

2.1. Overall Schematic Configuration

FIG. 1 is a schematic view showing a schematic overall configuration of a recording apparatus 100. First, the overall configuration of the recording apparatus 100 will be described with reference to FIG. 1.

As shown in FIG. 1, the recording apparatus 100 includes a medium transport portion 20, a medium adhesion portion 60, a belt support portion 91, a print portion 40, a heating unit 27, a washing unit 50, and the like. In the recording apparatus 100, at least one of the medium adhesion portion 60 and the belt support portion 91 corresponds to a heating portion to heat an endless belt 23. In addition, the recording apparatus 100 also includes a control portion 1 to control each of these portions described above. Each portion of the recording apparatus 100 is attached to a frame portion 90.

In addition, when the heating portion to heat the endless belt is provided, the heating portion may be provided upstream than the print portion 40 in the transport direction and may also be provided at a place different from those of the medium adhesion portion 60 and the belt support portion 91. For example, the heating portion may be located upstream than the medium adhesion portion 60 in the transport direction. With such a configuration, the heating portion can also dry the endless belt 23 wetted in the washing. In addition, the heating portion may be a portion to heat the endless belt in a non-contact manner.

The medium transport portion 20 transports the fabric 95 in the transport direction. The medium transport portion 20 includes a medium supply portion 10, transport rollers 21 and 22, the endless belt 23, a belt rotation roller 24, a belt drive roller 25 functioning as a drive roller, transport rollers 26 and 28, and a medium recovery portion 30.

2.2. Medium Transport Portion

First, the transport path of the fabric 95 from the medium supply portion 10 to the medium recovery portion 30 will be described. In addition, in FIG. 1, a direction along a direction in which the gravity works is represented by the Z axis direction, a direction in which the fabric 95 is transported in the print portion 40 is represented by the +X axis direction, and a width direction of the fabric 95 intersecting both the Z axis direction and the X axis direction is represented by the Y axis direction. Further, the positional relationship along the transport direction of the fabric 95 or the moving direction of the endless belt 23 is also represented by "upstream" or "downstream".

The medium supply portion 10 is a portion to supply the fabric 95 on which an image is to be formed to a print portion 40 side. The medium supply portion 10 includes a supply shaft portion 11 and a bearing portion 12. The supply shaft portion 11 is formed to have a cylindrical shape or a columnar shape and is provided to be rotatable in a circumferential direction. The strip-shaped fabric 95 is wound around the supply shaft portion 11 in a roll shape. The supply shaft portion 11 is detachably attached to the bearing portion 12. Accordingly, the fabric 95 wound around the supply shaft portion 11 in advance can be attached to the bearing portion 12 together with the supply shaft portion 11.

The bearing portion 12 rotatably supports both ends of the supply shaft portion 11 in a shaft direction. The medium supply portion 10 includes a rotation drive portion (not shown) that rotatably drives the supply shaft portion 11. The rotation drive portion rotates the supply shaft portion 11 in a direction to which the fabric 95 is supplied. The operation of the rotation drive portion is controlled by the control portion 1. The transport rollers 21 and 22 relay the fabric 95 from the medium supply portion 10 to the endless belt 23.

The endless belt 23 is held between at least two rollers to rotate the endless belt 23, and since the endless belt 23 is rotationally moved, the fabric 95 is transported in the transport direction (+X axis direction) while being supported by the endless belt 23. Specifically, the endless belt 23 is a seamless belt formed such that both end portions of a strip-shaped belt are seamlessly coupled to each other and is set between two rollers of the belt rotation roller 24 and the belt drive roller 25.

The endless belt 23 is held in a state where a predetermined tension is applied thereto so that a portion between the belt rotation roller 24 and the belt drive roller 25 is held flat along the horizontal direction. An adhesive 29 provided for adhesion of the fabric 95 is applied to a surface (support surface) 23*a* of the endless belt 23. That is, the endless belt 23 is provided with an adhesive layer formed from the adhesive 29. The fabric 95 is attached to the endless belt 23 with the adhesive 29 interposed therebetween. The endless belt 23 supports (holds) the fabric 95 which is supplied from the transport roller 22 and which is in close contact with the adhesive 29 by the medium adhesion portion 60.

The adhesive 29 preferably increases its adhesiveness by heating. Since the adhesive 29 which increases its adhesiveness by heating is used, the fabric 95 can be favorably in close contact with the adhesive layer. As the adhesive 29 as described above, for example, a hot melt-based adhesive having a thermoplastic elastomer SIS (styrene-isoprene-styrene) as a main component may be used.

The belt rotation roller 24 and the belt drive roller 25 support an inner circumferential surface 23*b* of the endless belt 23. Between the belt rotation roller 24 and the belt drive roller 25, a contact portion 69 to support the endless belt 23, the belt support portion 91, and a platen 46 are provided. The contact portion 69 is provided in a region facing a press portion 61 which will be described later with the endless belt 23 interposed therebetween, the platen 46 is provided in a region facing the print portion 40 with the endless belt 23 interposed therebetween, and the belt support portion 91 is provided between the contact portion 69 and the platen 46. Since the contact portion 69, the belt support portion 91, and the platen 46 support the endless belt 23, the endless belt 23 is prevented from being vibrated in conjunction with the movement of the endless belt 23.

The belt drive roller 25 is a drive portion to transport the fabric 95 in the transport direction by rotating the endless belt 23 and has a motor (not shown) to rotationally drive the belt drive roller 25. The belt drive roller 25 is provided downstream than the print portion 40 in the transport direction of the fabric 95, and the belt rotation roller 24 is provided upstream than the print portion 40. When the belt drive roller 25 is rotatably driven, the endless belt 23 is rotated in conjunction with the rotation of the belt drive roller 25, and by the rotation of the endless belt 23, the belt rotation roller 24 is rotated. By the rotation of the endless belt 23, the fabric 95 supported by the endless belt 23 is transported in the transport direction (+X axis direction), and in the print portion 40 which will be described later, an image is formed at the fabric 95.

In the example shown in FIG. 1, the fabric 95 is supported at a side (+Z axis side) at which the surface 23*a* of the endless belt 23 faces the print portion 40 and the fabric 95 is transported together with the endless belt 23 from a belt rotation roller 24 side to a belt drive roller 25 side. In addition, at a side (−Z axis side) at which the surface 23*a* of the endless belt 23 faces the washing unit 50, the endless belt 23 is only moved from the belt drive roller 25 side to the belt rotation roller 24 side.

The transport roller 26 peels away the fabric 95 on which an image is formed from the adhesive 29 provided on the endless belt 23. The transport rollers 26 and 28 relay the fabric 95 from the endless belt 23 to the medium recovery portion 30.

The medium recovery portion 30 recovers the fabric 95 transported from the medium transport portion 20. The medium recovery portion 30 includes a winding shaft portion 31 and a bearing portion 32. The winding shaft portion 31 is formed to have a cylindrical or a columnar shape and is provided to be rotatable in a circumferential direction. The strip-shaped fabric 95 is wound around the winding shaft portion 31 in a roll shape. The winding shaft portion 31 is detachably attached to the bearing portion 32. Accordingly, the fabric 95 wound around the winding shaft portion 31 is removed together with the winding shaft portion 31.

The bearing portion 32 rotatably supports both ends of the winding shaft portion 31 in the shaft direction. The medium recovery portion 30 includes a rotation drive portion (not shown) which rotatably drives the winding shaft portion 31. The rotation drive portion rotates the winding shaft portion 31 in a direction in which the fabric 95 is wound. The operation of the rotation drive portion is controlled by the control portion 1.

Next, the heating portion, the print portion 40, the heating unit 27, and the washing unit 50, which are provided along the medium transport portion 20, will be described.

2.3. Heating Portion

It is preferable that a heater which heats the endless belt 23 is provided in at least one of the contact portion 69 and the belt support portion 91. The heater forms the heating portion. When the heater is provided in the contact portion 69, since a pressing force and heat can be applied to the endless belt 23 by the press portion 61, the adhesion of the fabric 95 to the endless belt 23 can be preferably improved. Accordingly, when being provided in the contact portion 69 or the belt support portion 91, the heater is more preferably provided at the contact portion 69.

The heating portion softens the adhesive layer by heating the adhesive layer to exhibit adhesiveness and improves the adhesion between the fabric 95 and the adhesive layer. Accordingly, the fabric 95 is prevented from being moved on the endless belt 23, and thus, favorable transport accuracy can be obtained.

When the heater is provided in at least one of the contact portion 69 and the belt support portion 91 and the endless belt 23 is heated, the temperature of the surface 23*a* of the endless belt 23 is preferably 80° C. or lower, more preferably 70° C. or lower, and even more preferably 60° C. or lower. When the temperature of the surface 23*a* of the endless belt 23 is within the above range, the reactivity of the resin particles contained in the ink composition is suppressed, and the washing of the belt can be more easily performed in some cases. The lower limit of the temperature of the surface 23*a* of the endless belt 23 is not particularly limited as long as the adhesiveness of the adhesive layer is obtained, and the lower limit is preferably 30° C. or higher, more preferably 35° C. or higher, and even more preferably 40° C. or higher. The temperature of the surface 23*a* of the endless belt 23 can be measured, for example, by a radiation type thermometer, a contact type thermometer, or the like, and the temperature described above is more preferably measured by a radiation type thermometer.

When the heater is provided in at least one of the contact portion 69 and the belt support portion 91, a temperature detection portion (not shown) which detects the surface temperature of the endless belt 23 may be provided. As the temperature detection portion, for example, a thermocouple or the like can be used. Accordingly, since the heater is controlled by the control portion 1 based on the temperature detected by the temperature detection portion, the endless belt 23 can have a predetermined temperature. In addition, the temperature detection portion may use a non-contact type thermometer using infrared rays.

2.4. Print Portion

The print portion 40 is arranged at an upper side (+Z axis side) with respect to the arrangement position of the endless belt 23 and performs printing on the fabric 95 placed on the surface 23*a* of the endless belt 23. The print portion 40 includes an ink jet head 42, a carriage 43 on which the ink jet head 42 is mounted, and a carriage moving portion 45 which moves the carriage 43 in the width direction (Y axis direction) of the fabric 95 intersecting the transport direction.

The ink jet head 42 is a unit that ejects the liquid composition supplied from a liquid cartridge (not shown) from a plurality of nozzles to the fabric 95 under control by the control portion 1 to attach the liquid composition to the fabric. The ink jet head 42 includes a plurality of nozzles discharging the liquid composition to the fabric 95 to which the liquid composition is attached and attaching the liquid composition to the fabric 95. The plurality of nozzles are arrayed in a row to form a nozzle row, and the nozzle row is individually arranged corresponding to the liquid composition. The liquid composition are supplied from each liquid cartridge to the ink jet head 42 and are discharged in the form of liquid droplets from the nozzles by an actuator (not shown) provided in the ink jet head 42. The discharged liquid droplets of the liquid composition land on the fabric 95, and an image, a text, a pattern, a color, and the like are formed in the textile printing region of the fabric 95.

The liquid composition referred to here can be the treatment liquid composition, the coating liquid composition, the ink composition, and the reaction liquid composition described above. Further, the types and number of these liquid compositions can be set appropriately.

Here, in the ink jet head 42, a piezoelectric element is used as an actuator which is a drive unit, but the method is not limited thereto. For example, an electromechanical conversion element to displace a vibration plate functioning as an actuator by electrostatic adsorption or an electrothermal conversion element to discharge a liquid composition in the form of liquid droplets by air bubbles generated by heating may be used.

Figure 2:
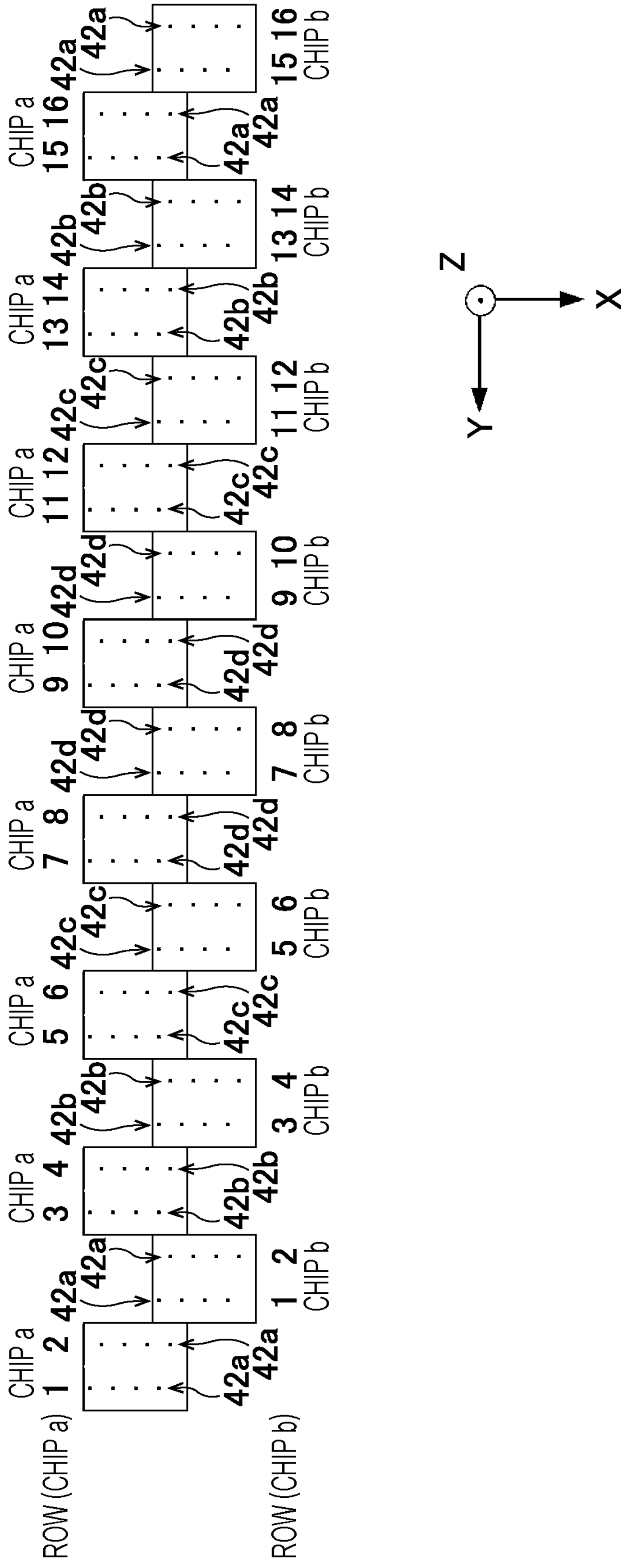
FIG. 2 is a schematic view illustrating an example of an array of nozzle rows of ink jet heads.

FIG. 2 is a schematic view showing an example of an array of nozzle rows of the ink jet heads. In the example in FIG. 2, the ink jet head is provided with a nozzle row 42*a* having a nozzle group that discharges the coating liquid composition, a nozzle row 42*b* having a nozzle group that discharges the treatment liquid composition, a nozzle row 42*c* having a nozzle group that discharges the ink composition, and a nozzle row 42*d* having a nozzle group that discharges the reaction liquid composition. Two rows of nozzle groups configure one chip. Then, eight chips a that are positioned on the upstream in an X direction, and eight chips b that are positioned on the downstream are each arranged along a Y direction to form a row of the chip a and a row of the chip b. In this example, these 16 chips are arranged in a zigzag pattern (in a staggered manner) along the Y direction and are included in the carriage.

Each row of the chips on the upstream and the downstream in the X direction is can attach each composition to the same region of the fabric at appropriate timing in one main scanning. In addition, two rows of the chips are arranged so as to be shifted in a sub-scanning direction (X axis direction), and depending on the distance of movement of the fabric by the sub-scanning, the region to which each composition is attached can be changed or each composition can be attached multiple times to the same region.

The nozzle group performing discharge means a nozzle group used for recording in the recording method. When there is an image to be temporarily recorded in a region of the fabric facing the nozzle group at a time of performing the main scanning (Y-axis direction), the nozzle group is a nozzle group that can discharge the liquid composition from the nozzle, and the nozzle group continuous in the transport direction (+X-axis direction). Therefore, although the nozzle group itself exists, the nozzle group not used for recording in the recording method is not included in the nozzle group performing discharge.

The carriage moving portion 45 is provided on the upper side (+Z axis side) of the endless belt 23. The carriage moving portion 45 has a pair of guide rails 45*a* and 45*b* extending along the Y axis direction. The ink jet head 42 is supported by the guide rails 45*a* and 45*b* so as to be reciprocally movable along the Y axis direction together with the carriage 43.

The carriage moving portion 45 includes a moving mechanism (not shown) and a power source. As the moving mechanism, for example, a mechanism in which a ball screw and a ball nut are combined, a linear guide mechanism, or the like can be used. The carriage moving portion 45 includes a motor (not shown) as a power source for moving the carriage 43 along the guide rails 45*a* and 45*b*. As the motor, various motors such as a stepping motor, a servo motor, and a linear motor can be used. When the motor is driven by the control of the control portion 1, the ink jet head 42 moves in the Y axis direction together with the carriage 43.

2.5. Heating Unit

The heating unit 27 may be provided between the transport roller 26 and the transport roller 28. The heating unit 27 heats the ink composition or the treatment liquid discharged on the fabric 95. Accordingly, there is a tendency that the reaction of the resin particles contained in the ink composition can sufficiently proceed. Since the resin particles sufficiently react, an image having favorable rubbing fastness may be formed in some cases. The heating unit 27 may be used in order to dry drying the fabric 95. In the heating unit 27, for example, an IR heater is contained, and by driving the IR heater, the ink composition and the treatment liquid discharged on the fabric 95 can be made to react to each other in a short time. Accordingly, the strip-shaped fabric 95 on which an image or the like is formed can be wound around the winding shaft portion 31.

2.6. Washing Unit

The washing unit 50 is arranged between the belt rotation roller 24 and the belt drive roller 25 in the X axis direction. The washing unit 50 includes a washing portion 51, a press portion 52, and a movement portion 53. The movement portion 53 integrally moves the washing unit 50 along a floor surface 99 and then fixes the washing unit 50 at a predetermined position.

The press portion 52 is an elevating device formed, for example, of an air cylinder 56 and a ball bush 57 and enables the washing portion 51 provided on the upper side to come into contact with the surface 23*a* of the endless belt 23. The washing portion 51 is set between the belt rotation roller 24 and the belt drive roller 25 in a state in which a predetermined tension is applied, and washes the surface (support surface) 23*a* of the endless belt 23 moving from the belt drive roller 25 toward the belt rotation roller 24 from a bottom side (−Z axis direction).

The washing portion 51 includes a washing bath 54, a washing roller 58, and a blade 55. The washing bath 54 is a tank that stores a washing liquid used for washing ink and foreign matter attached to the surface 23*a* of the endless belt 23, and the washing roller 58 and the blade 55 are provided inside the washing bath 54. As the washing liquid, for example, water or a water-soluble solvent (such as an aqueous alcohol solution) may be used, and as necessary, a surfactant and a defoaming agent may also be added.

When the washing roller 58 is rotated, the washing liquid is supplied to the surface 23*a* of the endless belt 23, and at the same time, the washing roller 58 and the endless belt 23 are rubbed with each other. Accordingly, the ink composition, the fibers of the fabric 95, and the like attached to the endless belt 23 are removed by the washing roller 58.

The blade 55 may be formed of, for example, a flexible material such as a silicone rubber. The blade 55 is provided downstream than the washing roller 58 in the transport direction of the endless belt 23. Since the endless belt 23 and the blade 55 are rubbed with each other, the washing liquid remaining on the surface 23*a* of the endless belt 23 is removed.

According to such a recording apparatus 100, the recording method of the present embodiment can be easily performed.

3. Examples and Comparative Examples

Hereinafter, the present disclosure will be specifically described with reference to Examples, and the present disclosure is not limited to these Examples. Hereinafter, "part" and "%" are based on mass unless otherwise specified. Unless otherwise specified, the evaluation was performed in an environment of a temperature of 25° C. and a relative humidity of 40.0%.

3.1. Preparation of Each Composition

The reaction liquid composition, the black ink composition, the coating liquid composition, and the treatment liquid composition were prepared as follows.

3.1.1. Preparation of Reaction Liquid Composition

Each component was placed in a container so as to have the composition shown in Table 1, mixed and stirred with a magnetic stirrer for 2 hours, and then filtered through a membrane filter having a pore size of 5 μm to obtain reaction liquids "inks 1-1 to 1-4" used in Examples and Comparative Examples. The numerical values in the tables represent the amount of active components.

3.1.2. Preparation of Black Ink Composition

Each component was placed in a container so as to have the composition shown in Table 2, mixed and stirred with a magnetic stirrer for 2 hours, and then filtered through a membrane filter having a pore size of 5 μm to obtain a black ink liquid "ink 2-1" used in Examples and Comparative Examples. The numerical values in the tables represent the amount of active components. In addition, as the anionic self-dispersing pigment and the anionic resin dispersed pigment, pigment dispersion liquids prepared as follows were used.

Self-Dispersing Pigment 500 g of carbon black bulk powder prepared by a furnace method (primary particle diameter=18 nm, BET specific surface area=180 $m^2/g$, DBP absorption amount=186 mL/100 g) was added to 3750 g of ion exchange water, and the temperature was raised to 45° C. while stirring using a dissolver. After that, 30000 g of an aqueous solution of sodium hypochlorite (effective chlorine concentration=12%) was added dropwise over 3.5 hours at 45° C. while pulverizing with a sand mill using zirconia beads having a diameter of 0.8 mm. The pulverization with the sand mill was then continued for a further 30 minutes to obtain a reaction liquid containing a self-dispersing type carbon black. The reaction liquid was filtered using 400 mesh wire netting, and thus the zirconia beads and unreacted carbon black were separated from the reaction liquid. A 5% potassium hydroxide aqueous solution was added to the reaction liquid obtained through the separation to adjust the pH to 7.5. Desalination and purification were then carried out using an ultrafilter membrane until the electrical conductivity of the liquid reached 1.5 mS/cm. Desalination and purification were then further carried out using an electrodialyser until the electrical conductivity of the liquid reached 1.0 mS/cm. The liquid was then concentrated until the self-dispersing type carbon black concentration reached 17% by mass. The concentrate was subjected to a centrifugal separator, coarse particles were removed, and filtration was carried out with a 0.6 μm filter. Ion exchange water was added to the filtrate obtained to dilute the filtrate until the self-dispersing type carbon black concentration reached 15% by mass, and dispersion was carried out to obtain self-dispersing pigment dispersion liquid.

3.1.3. Preparation of Coating Liquid Composition

Each component was placed in a container so as to have the composition shown in Table 3, mixed and stirred with a magnetic stirrer for 2 hours, and then filtered through a membrane filter having a pore size of 5 μm to obtain third inks (coating liquid compositions) "inks 3-1 and 3-2" used in Examples and Comparative Examples. The numerical values in the tables represent the amount of active components.

3.1.4. Preparation of Treatment Liquid Composition

Fourth inks (softening liquid compositions) "inks 4-1 to 4-7" shown in Table 4 were obtained as follows. The numerical values in the tables represent the amount of active components.

Inks 4-2, 4-6, and 4-7

90 g of dimethyl silicone oil (KF-96H-10000 cs, Shin-Etsu Chemical Co., Ltd.), 171.5 g of ion exchange water, 6.4 g of polyoxyethylene tridecyl ether (NEWCOL 1310, Nippon Nyukazai Co., Ltd.), 6.4 g of polyoxyethylene tridecyl ether (NEWCOL 1305, Nippon Nyukazai Co., Ltd.), other nonionic surfactants listed in Table 4, and 25.7 g of 1,2-hexanediol were placed in a beaker, and the contents of the beaker were stirred for 30 minutes at 50° C. at a rotation speed of 2000 rpm using a homomixer (Homo Mixer MARK II Model 2.5, manufactured by PRIMIX Corporation), and left to stand for 30 minutes. Next, the contents of the beaker were filtered through a 10 μm membrane filter to obtain 300 g of an emulsion in which oil particles containing silicone oil were dispersed. Subsequently, ion exchange water and glycerin were added thereto and stirred to prepare inks 4-2, 4-6, and 4-7 shown in Table 4.

inks 4-4 and 4-5 were prepared in such a manner that the amount of dimethyl silicone oil (KF-96H-10000 cs, Shin-Etsu Chemical Co., Ltd.) was changed, emulsion was obtained in the same manner, and ion exchange water, glycerin, and polyvinylpyrrolidone were additionally added and stirred to have the concentrations shown in Table 4. ink 4-3 was prepared in the same manner as in the preparation of ink 4-2 except that polyoxyethylene dilaurate was used instead of the dimethyl silicone oil.

Ink 4-1

90 g of amino-modified silicone oil (KF-868, functional group equivalent: 8, 800 g/mol, manufactured by Shin-Etsu Chemical Co., Ltd.), 173.2 g of ion exchange water, 5.1 g of polyoxyethylene tridecyl ether (NEWCOL 1310, Nippon Nyukazai Co., Ltd.), 25.7 g of 1,2-hexanediol, and 6 g of lactic acid were placed in a beaker, and the contents of the beaker were stirred for 30 minutes at 50° C. at a rotation speed of 2000 rpm using a homomixer (HOMO MIXER MARK II Model 2.5, manufactured by PRIMIX Corporation), and left to stand for 30 minutes. Next, the contents of the beaker were filtered through a 10 μm membrane filter to obtain 300 g of an emulsion in which oil particles containing amino-modified silicone oil were dispersed. Subsequently, ion exchange water and glycerin were added and stirred to prepare ink 4-1.

"OLFINE E1010" shown in Tables 1 to 3 is an acetylene glycol-based surfactant manufactured by Nissin Chemical Industry Co., Ltd. In addition, as the "wax" listed in Table 3, a polyethylene wax (AQUACER 515, BYK Japan KK.) was used.

3.2. Evaluation Method 3.2.1. Recording Test

Using an apparatus modified from ML-8000 (manufactured by Seiko Epson Corporation), printing was performed on a fabric of 100% cotton white broad cloth (#4000, manufactured by Nisshinbo Holdings Inc.) under the conditions described in Examples. Main scanning was performed multiple times (2 times, 4 times, 8 times, 12 times, or 16 times) on the same scanning region to form a solid pattern image of 20 cm×5 cm in the fabric.

After image formation, the resulting recorded matter was left to stand for 3 minutes, a heating treatment was then started at 160° C. for 3 minutes in an oven, and drying was performed to prepare a printed textile according to each Example and each Comparative Example. In addition, the "solid pattern image" means an image in which dots are uniformly formed in the entire surface of the recording region (main scanning direction×sub-scanning direction: 20 cm×5 cm) so that the application amount of each ink has the numerical value described in Examples.

As the ink jet head, a head unit was used in which a distance between nozzles in the sub-scanning direction was 600 dpi and two head chips were arranged in the sub-scanning direction so that the nozzle length was more than 2 inches as shown in FIG. 2. In addition, in each example, each ink was charged so that the head nozzle group discharging each ink was arranged in the main scanning direction as shown in the head configuration in FIG. 3.

Further, the details of the strike methods 1 to 5 described in Table 5 to Table 7 are shown in FIG. 3. FIG. 3 is an image view of a nozzle row configuration of the head. A plurality of nozzle rows are arranged in parallel in a left-right direction in FIG. 3. The chip a and the chip b are vertically shown in FIG. 3, but in an actual nozzle array, the chips are arranged side by side on the left and right as shown in FIG. 2. In other words, each row is provided with the chip a and the chip b arranged on the left and right. The chip a and the chip b each have two nozzle rows. The compositions discharged from each row are shown in FIG. 3. A blank space indicates that the corresponding composition is not discharged.

In FIG. 3, the left-right direction is a main scanning direction. Recording is performed by performing a plurality of times of scanning in the main scanning direction. First, each composition is discharged by the nozzle row configuration described in Step 1, and when the application amount reaches a predetermined application amount, each composition is discharged by the nozzle row configuration described in Step 2. In the strike methods 1 to 5, the strike method is changed by changing the nozzle row configuration of the head. In each strike, the composition described in the same step is discharged within the same main scanning. When scanning is performed in the left direction, the nozzle rows of the head pass in the order of rows 1, 2, and 3 in a predetermined region of the recording medium, and the composition is attached in this order. In addition, in each example, the sub-scanning of the fabric is not performed, and Steps 1 to 3 are performed at the same position on the fabric.

Figure 4:
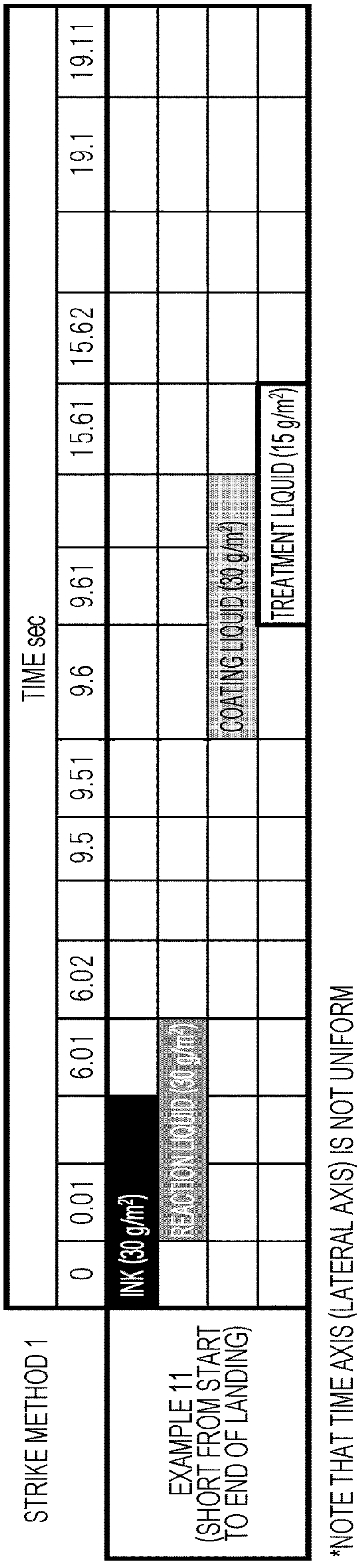
FIG. 4 is a diagram showing an example of a strike method.

FIG. 4 is a schematic diagram showing a temporal image of attachment of each composition in the recording method of Example 11. FIG. 4 is a diagram showing strike method 1 as an example.

3.2.2. Evaluation of Color Development (Black)

For the printed matter obtained by the above printing method, the surface of the printed image was determined according to the following criteria by measuring the optical density (OD value, Status E) of black of the printed image using a colorimeter (FD-7, manufactured by Konica Minolta Inc.).

Determination Criteria

S: OD value of 1.60 or more

A: OD value of 1.51 or more and less than 1.60

B: OD value of 1.46 or more and less than 1.51

C: OD value of less than 1.46

3.2.3. Evaluation of Bleeding

A printed matter obtained by starting a heat treatment for 3 minutes at 160° C. in an oven at the time of being left for 60 minutes after image formation, and then dried in the above-described printing method was prepared for each example. In addition, a printed matter at the time of drying after performing printing with the reaction liquid composition and the black ink composition in Example 1 was prepared as a reference. The boundary between the printed image region and the unprinted non-printing region was observed, and a difference in the length (mm) in the sub-scanning direction of the printed image, which was left to stand for 60 minutes in each example, with respect to the printed image as the reference, was determined according to the following criteria.

Determination Criteria

S: The difference in length is 1 mm or less.

A: The difference in length is more than 1 mm and 3 mm or less.

B: The difference in length is more than 3 mm and 7 mm or less.

S: The difference in length is more than 7.

3.2.4. Evaluation of Yellowing

A printed cloth obtained by performing recording on a recording cloth at 30 g/$m^2$ only with the fourth ink (treatment liquid) of each example in the above-described printing method, and drying the recorded matter by the above-described method was prepared, and the surface of the printed image was measured using a colorimeter (FD-7, manufactured by Konica Minolta Inc.) and was used as a sample. In addition, a cloth that was dried in an oven at 160° C. for 3 minutes without printing with a printer in the above-described method was prepared, L*, a*, and b* values were measured in the same manner, and the cloth was used as a reference. A color difference ΔE00 (ΔE2000) of the sample with respect to the reference was calculated and determined according to the following criteria.

Determination Criteria

A: The color difference ΔE00 is 2 or less.

B: The color difference ΔE00 is more than 2.

3.2.5. Evaluation of Abrasion Resistance (Dry)

For the printed textile prepared by using the above-described printing method, the image of the printed textile was rubbed 10 times with shirting (white cotton cloth) using a crock meter (FI-306, manufactured by Tester Sangyo Co., Ltd.) with a load of 9N. Thereafter, for the region contaminated with the ink of the rubbed shirting, the optical density (OD, Status E) of black of the printed image was measured using a colorimeter (FD-7, manufactured by Konica Minolta Inc.) and determined according to the following criteria.

Determination Criteria

S: The OD of black is 0.15 or less.

A: The OD of black is more than 0.15 and 0.19 or less.

B: The OD of black is more than 0.19 and 0.23 or less.

C: The OD of black is more than 0.23.

3.2.6. Evaluation of Storage Stability of Treatment Liquid Composition

The fourth ink (treatment liquid) of each example was prepared and left to stand for 3 days in an environment at 40° C. Thereafter, concentration changes due to floating or settling of the emulsified and dispersed particles were visually confirmed and determined according to the following criteria.

Determination Criteria

A: No change in appearance

B: The emulsified and dispersed particles float or settle, and there is a shade difference in appearance.

3.2.7. Evaluation of Mixing and Aggregation Properties With Reaction Liquid Composition 15 mL of the first ink (reaction liquid) is placed in a glass bottle having a volume of 30 mL, and 0.1 mL of the second ink (black ink composition), the third ink (coating liquid) or the fourth ink (treatment liquid) is added dropwise thereon with a pipette at 25° C. The ink added dropwise is left to stand at 25° C. for 1 minute, and then the mixture is shaken and stirred 5 times. When the precipitate or suspended matter can be visually confirmed, it is determined that the mixing and aggregation properties are "confirmed". On the other hand, when it is visually dissolved or diluted, it is determined that the mixing and aggregation properties are "not confirmed". The results are shown in Tables 5 to 7.

In the recording method according to the present disclosure, the reaction liquid composition and the black ink composition do not form precipitates and floating substances when mixed with each other (hereinafter, this properties are also referred to as "mixing aggregation properties"). By selecting a combination of the reaction liquid composition and the black ink composition exhibiting the mixing and aggregation properties, the generation of aggregates on the surface of the printed textile can be suppressed. Similarly, the tests were carried out using the coating liquid composition and the treatment liquid composition instead of the black ink composition and the mixing and aggregation properties with the respective reaction liquid compositions were evaluated.

3.3. Evaluation Results

In each of Examples in which the reaction liquid attachment step of attaching the reaction liquid composition containing the aggregating agent that aggregates components in the ink to the fabric, the ink attachment step of attaching the black ink composition containing the black pigment and water to the fabric by an ink jet method, the coating liquid attachment step of attaching the coating liquid composition containing anionic resin particles and water to the fabric by an ink jet method, and the treatment liquid attachment step of attaching the treatment liquid composition containing any specific substance selected from particles containing forcibly emulsified organopolysiloxane and an aliphatic ester, and water, and not containing a coloring material, or having a coloring material content of 0.1% by mass or less with respect to the total amount of the treatment liquid composition to the fabric by an ink jet method were provided, the content of the specific substance was 60% by mass or more with respect to a total amount of the non-volatile components in the treatment liquid composition, the coating liquid attachment step was performed before the treatment liquid attachment step, and the time difference from when the coating liquid composition was attached by the coating liquid attachment step to when the treatment liquid composition was attached to the region to which the coating liquid composition was attached by the treatment liquid attachment step was 60 seconds or shorter, it was found that favorable recorded matter with favorable image color developability and abrasion resistance (dry) and little bleeding was obtained.

The present disclosure includes a configuration substantially the same as the configuration described in the embodiment, for example, a configuration having the same function, method, and result, or a configuration having the same purpose and effect. Further, the present disclosure includes configurations in which non-essential parts of the configuration described in the embodiments are replaced. In addition, the present disclosure includes configurations that achieve the same effects or configurations that can achieve the same objects as those of the configurations described in the embodiment. Further, the present disclosure includes configurations in which a known technology is added to the configurations described in the embodiments.

The following contents are derived from the above-described embodiments and modification examples.

A recording method includes a reaction liquid attachment step of attaching a reaction liquid composition containing an aggregating agent that aggregates components in an ink to a fabric, an ink attachment step of attaching a black ink composition containing a black pigment and water to the fabric by an ink jet method, a coating liquid attachment step of attaching a coating liquid composition containing anionic resin particles and water to the fabric by an ink jet method, and a treatment liquid attachment step of attaching a treatment liquid composition, which contains any specific substance selected from particles containing forcibly emulsified organopolysiloxane and an aliphatic ester, and water, and does not contain a coloring material or has a coloring material content of 0.1% by mass or less with respect to a total amount of the treatment liquid composition, to the fabric by an ink jet method, in which a content of the specific substance is 60% by mass or more with respect to a total amount of non-volatile components in the treatment liquid composition, the coating liquid attachment step is performed before the treatment liquid attachment step, and a time difference from when the coating liquid composition is attached by the coating liquid attachment step to when the treatment liquid composition is attached to a region to which the coating liquid composition is attached by the treatment liquid attachment step is 60 seconds or shorter.

According to the recording method, the color developability of black can be improved by applying the treatment liquid to the fabric. However, due to the attachment of the treatment liquid (particularly when the attachment amount is large), the dry rubbing fastness may be decreased or the treatment liquid may bleed. In contrast, bleeding can be suppressed by attaching the treatment liquid later and, further, the dry rubbing fastness can be improved by using the coating liquid in combination.

When the treatment liquid is mixed with the coating liquid, the treatment liquid inhibits the aggregation reaction of the coating liquid and the reaction liquid (since containing a large amount of the emulsifier due to forced emulsification), and the dry rubbing fastness is less likely to be improved. Therefore, in this recording method, the coating liquid is applied before the treatment liquid, an aggregation reaction is caused to thicken the coating liquid, and then the treatment liquid is applied. As a result, the coating liquid remains on the ink film and can sufficiently cover the ink film, so that the dry rubbing fastness is improved. On the other hand, when the time difference is too long, the coating liquid is completely thickened, and even when the treatment liquid is attached, the thickened coating liquid is not diffused into the treatment liquid. Thus, the treatment liquid is not thickened. In this case, the treatment liquid is likely to bleed. Therefore, by setting the time difference between the attachment of the coating liquid and the attachment of the treatment liquid to 60 seconds or shorter, the bleeding of the treatment liquid can be suppressed.

In the recording method, the time difference from when the coating liquid composition is attached by the coating liquid attachment step to when the treatment liquid composition is attached to the region to which the coating liquid composition is attached by the treatment liquid attachment step may be 1 second or shorter.

When the time difference is too long, the coating liquid is completely thickened, and even when the treatment liquid is attached, the thickened coating liquid is not diffused into the treatment liquid. Thus, the treatment liquid is not thickened. In this case, the treatment liquid is likely to bleed. According to the recording method, by setting the time difference between the attachment of the coating liquid and the attachment of the treatment liquid to 1 second or shorter, the bleeding of the treatment liquid can be more favorably suppressed.

The recording method may further include a second coating liquid attachment step of attaching the coating liquid composition to a region to which the treatment liquid composition is attached, after the treatment liquid composition is attached by the treatment liquid attachment step, and the coating liquid attachment step, the treatment liquid attachment step, and the second coating liquid attachment step may be performed in the same scanning.

According to the recording method, the bleeding-out of the treatment liquid which is less likely to aggregate with the reaction liquid is suppressed by covering the bleeding-out of the treatment liquid with the coating liquid which easily aggregates with the reaction liquid, and the bleeding of the treatment liquid can be further suppressed.

In the recording method, a time from a start to an end of the treatment liquid attachment step to a predetermined region of the fabric may be 25 seconds or longer.

According to this recording method, since the time from the start to the end of the treatment liquid attachment step is long, the time for thickening due to moisture evaporation, or mixing and diffusion of the reaction liquid and the ink or the coating liquid can be sufficiently secured, and thus aggregation easily occurs. Thus, the effect of suppressing the bleeding of the treatment liquid is further improved.

In the recording method, the treatment liquid composition may contain the particles containing forcibly emulsified organopolysiloxane, and the organopolysiloxane may be a nonionic silicone.

According to the recording method, the yellowing of the printed textile can be further reduced.

In the recording method, the treatment liquid composition may contain the particles containing forcibly emulsified organopolysiloxane, and the organopolysiloxane may be an amino-modified silicone.

According to the recording method, the bleeding of the treatment liquid can be further suppressed.

In the recording method, the treatment liquid composition may contain surfactants, and all of the surfactants may have an HLB value of 8 or more.

According to the recording method, the storage stability of the treatment liquid is further improved. One reason for this is considered to be that a surfactant having a low HLB value is easily absorbed by a hydrophobic colorant, and the adsorption of other surfactants is inhibited.

In the recording method, the ink attachment step may be performed before the coating liquid attachment step.

According to the recording method, a printed textile having more favorable dry rubbing fastness can be obtained.

In the recording method, a content of a coloring material in the coating liquid composition may be 0.1% by mass or less with respect to a total amount of the coating liquid composition.

What is claimed is:

1. A recording method comprising:

a reaction liquid attachment step of attaching a reaction liquid composition containing an aggregating agent that aggregates components in an ink to a fabric;

an ink attachment step of attaching a black ink composition containing a black pigment and water to the fabric by an ink jet method;

a coating liquid attachment step of attaching a coating liquid composition containing anionic resin particles and water to the fabric by an ink jet method; and a treatment liquid attachment step of attaching a treatment liquid composition that contains water and a specific substance to the fabric by an ink jet method, wherein the treatment liquid composition does not contain a coloring material or has a coloring material content of 0.1% by mass or less with respect to a total amount of the treatment liquid composition, wherein the specific substance is in the form of particles containing forcibly emulsified organopolysiloxane or the specific substance is an aliphatic ester, a content of the specific substance is 60% by mass or more with respect to a total amount of non-volatile components in the treatment liquid composition, the coating liquid attachment step is performed before the treatment liquid attachment step, and a time difference from when the coating liquid composition is attached by the coating liquid attachment step to when the treatment liquid composition is attached to a region to which the coating liquid composition is attached by the treatment liquid attachment step is 60 seconds or shorter.

2. The recording method according to claim 1, wherein the time difference from when the coating liquid composition is attached by the coating liquid attachment step to when the treatment liquid composition is attached to the region to which the coating liquid composition is attached by the treatment liquid attachment step is 1 second or shorter.

3. The recording method according to claim 1, further comprising:

a second coating liquid attachment step of attaching the coating liquid composition to a region to which the treatment liquid composition is attached, after the treatment liquid composition is attached by the treatment liquid attachment step, wherein the coating liquid attachment step, the treatment liquid attachment step, and the second coating liquid attachment step are performed in the same scanning.

4. The recording method according to claim 1, wherein a time from a start to an end of the treatment liquid attachment step to a predetermined region of the fabric is 25 seconds or longer.

5. The recording method according to claim 1, wherein the treatment liquid composition contains the particles containing forcibly emulsified organopolysiloxane, and the organopolysiloxane is a nonionic silicone.

6. The recording method according to claim 1, wherein the treatment liquid composition contains the particles containing forcibly emulsified organopolysiloxane, and the organopolysiloxane is an amino-modified silicone.

7. The recording method according to claim 1, wherein the treatment liquid composition contains surfactants, and all of the surfactants has an HLB value of 8 or more.

8. The recording method according to claim 1, wherein the ink attachment step is performed before the coating liquid attachment step.

9. The recording method according to claim 1, wherein a content of a coloring material in the coating liquid composition is 0.1% by mass or less with respect to a total amount of the coating liquid composition.

* * * * *